(12) United States Patent
Uchida et al.

(10) Patent No.: US 8,454,241 B2
(45) Date of Patent: Jun. 4, 2013

(54) ROLLING DEVICE

(75) Inventors: Hiroyuki Uchida, Fujisawa (JP);
Takamasa Ohira, Fujisawa (JP); Haruo Kamijo, Fujisawa (JP); Tsuyoshi Saito, Fujisawa (JP); Dai Kinno, Fujisawa (JP); Shingo Higashi, Fujisawa (JP); Naohiro Yoshida, Fujisawa (JP); Sadayuki Tanaka, Fujisawa (JP); Seisuke Takeda, Fujisawa (JP); Akitoshi Maeda, Fujisawa (JP); Tooru Shouda, Fujisawa (JP); Masateru Kondo, Fujisawa (JP); Kazunobu Taketa, Fujisawa (JP); Tomohiro Motoda, Fujisawa (JP)

(73) Assignee: NSK Ltd., Tokyo (JP)

( * ) Notice: Subject to any disclaimer, the term of this patent is extended or adjusted under 35 U.S.C. 154(b) by 668 days.

(21) Appl. No.: 12/302,430

(22) PCT Filed: May 31, 2007

(86) PCT No.: PCT/JP2007/061125
§ 371 (c)(1),
(2), (4) Date: Jul. 10, 2009

(87) PCT Pub. No.: WO2007/139197
PCT Pub. Date: Dec. 6, 2007

(65) Prior Publication Data
US 2010/0021097 A1    Jan. 28, 2010

(30) Foreign Application Priority Data

| | | | |
|---|---|---|---|
| May 31, 2006 | (JP) | | 2006-152377 |
| Jul. 13, 2006 | (JP) | | 2006-193297 |
| Jul. 26, 2006 | (JP) | | 2006-203505 |
| Jul. 26, 2006 | (JP) | | 2006-203506 |
| Aug. 3, 2006 | (JP) | | 2006-212484 |
| Nov. 13, 2006 | (JP) | | 2006-306098 |

(51) Int. Cl.
*F16C 33/62* (2006.01)

(52) U.S. Cl.
USPC .......................................... 384/492; 384/907

(58) Field of Classification Search
USPC .................. 384/491, 492, 565, 907, 912, 913
See application file for complete search history.

(56) References Cited

U.S. PATENT DOCUMENTS 2,378,588 A    6/1945  Skehan et al.
3,077,285 A *  2/1963  Pranas Budininkas ....... 384/912

(Continued)

FOREIGN PATENT DOCUMENTS

DE    41 42 313 A1    6/1993
EP    0 695 884 A1    2/1996

(Continued)

OTHER PUBLICATIONS

Translation of JP5240256 obtained on Dec. 19, 2011.*

(Continued)

*Primary Examiner* — James Pilkington
(74) *Attorney, Agent, or Firm* — Crowell & Moring LLP

(57) ABSTRACT

A rolling device in which rust development or damage on a raceway surface or rolling surface is hard to occur even if water and the like intrude is provided. A self-aligning roller bearing comprises an inner ring 1, an outer ring 2, and a plurality of rolling elements 3 disposed rotatably between a raceway surface 1a of the inner ring 1 and a raceway surface 2a of the outer ring 2. At least any one of the inner ring 1, the outer ring 2, and the rolling elements 3 is provided with a metal coating formed by shot peening of a powder of metal less noble than iron at least on a part of its surface.

5 Claims, 21 Drawing Sheets

U.S. PATENT DOCUMENTS

| | | | |
|---|---|---|---|
| 4,189,522 A | 2/1980 | Mori | |
| 4,595,302 A * | 6/1986 | Attinger et al. | 384/558 |
| 5,352,046 A * | 10/1994 | Ward | 384/492 |
| 5,860,747 A * | 1/1999 | Wan et al. | 384/463 |
| 6,146,021 A | 11/2000 | Ward | |
| 6,165,289 A | 12/2000 | Matsumoto et al. | |
| 6,692,155 B2 * | 2/2004 | Shimomura et al. | 384/492 |
| 6,814,685 B2 * | 11/2004 | Hirai et al. | 384/912 |
| 2001/0033706 A1 | 10/2001 | Shimomura et al. | |
| 2005/0078897 A1 | 4/2005 | Zhang | |

FOREIGN PATENT DOCUMENTS

| | | |
|---|---|---|
| EP | 1 160 339 A2 | 12/2001 |
| GB | 1041620 A | 9/1966 |
| JP | 5-240256 A | 9/1993 |
| JP | 6-109022 A | 4/1994 |
| JP | 9-329147 A | 12/1997 |
| JP | 10-184700 A | 7/1998 |
| JP | 11-132229 A | 5/1999 |
| JP | 2002-106588 A | 4/2002 |
| JP | 2002-139052 A | 5/2002 |
| JP | 2002-147473 A | 5/2002 |
| JP | 2002-181050 A | 6/2002 |
| JP | 2003-239992 A | 8/2003 |
| JP | 2006-70320 A | 3/2006 |

OTHER PUBLICATIONS

Technical Data Sheet, JIS B 0601, 1994, http://www.misumiusa.com/CategoryImages/Metric_2009_pdf/p2839.pdf.*

Technical Data Sheet, JIS B 0601, 1994, http://in.misumi-ec.com/contents/tech/press/20.html.*

International Preliminary Report on Patentability w/English translation of pertinent portion (eleven (11) pages).

International Search Report dated Jul. 3, 2007 (one (1) page).

Extended European Search Report dated Oct. 19, 2012 (thirteen (13) pages).

* cited by examiner

F I G. 11
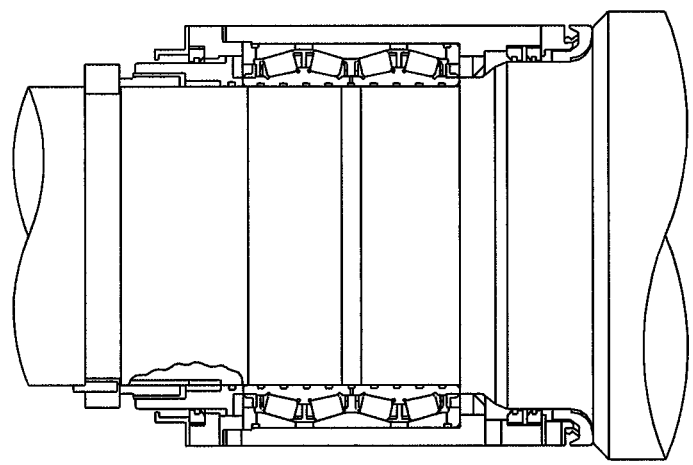

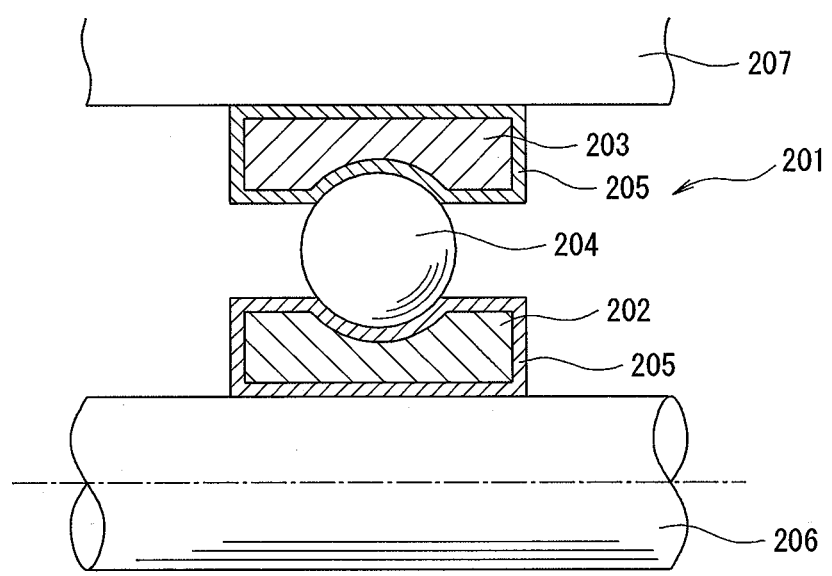
F I G. 25

FIG. 27

| | TREATMENT | RUST TEST (TIME) | CONDUCTIVE DURABILITY TEST (MAXIMUM RESISTANCE VALUE) | BEARING HIGH-TEMPERATURE DURABILITY (TIME) | COATING THICKNESS (μm) |
|---|---|---|---|---|---|
| EXAMPLE | Zn+Sn SHOT PEENING PROCESSING | 720 | 40 | 5000 | 4 |
| COMPARATIVE EXAMPLE | Zn SHOT PEENING PROCESSING | 100 | 43 | 3800 | 3 |
| | Sn SHOT PEENING PROCESSING | 200 | 37 | 4500 | 3 |
| | ELECTROLESS NICKEL PLATING | 720 | 130 | 2800 | 3 |
| | BEARING STEEL | 24 | 120 | 3000 | 0 |

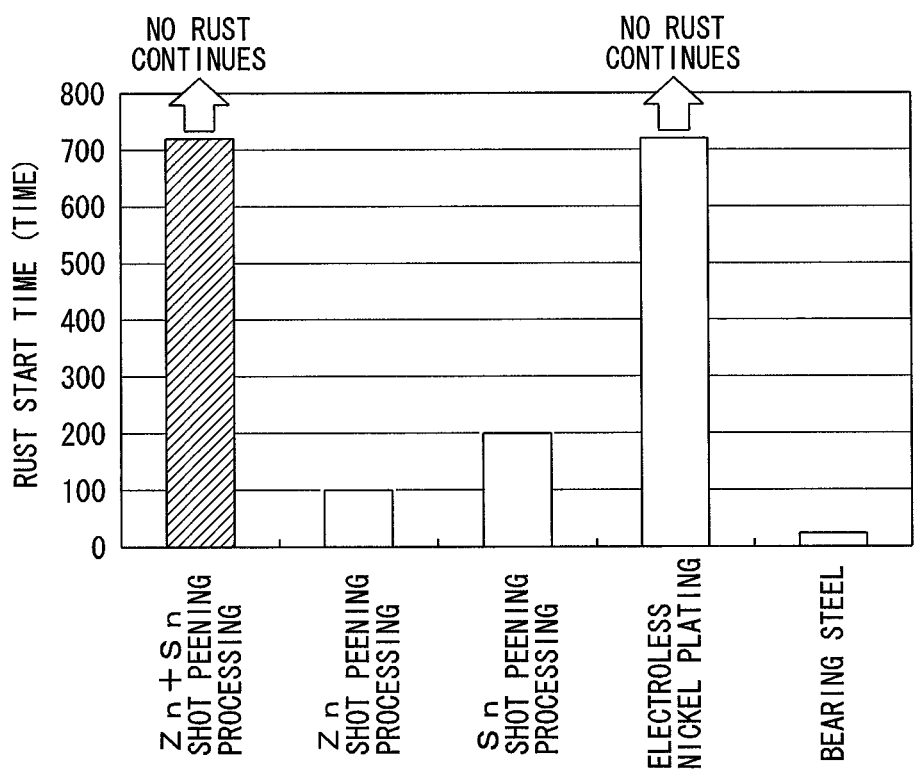
F I G. 28

ROLLING DEVICE

TECHNICAL FIELD

The present invention relates to a rolling device such as rolling bearing, linear guide device, ball screw, linear bearing and the like and particularly to a rolling device in which rust is difficult to develop inside.

BACKGROUND ART

A rolling bearing might be used in an environment where water can easily intrude into a bearing. For example, a rolling machine in steel facilities is a facility for mainly rolling a steel plate, and a rolling bearing for rotatably supporting a roll is used in a roll neck part of a rolling roll. In general, a multi-row tapered or cylindrical roller bearing is used. At rolling, since a large quantity of rolling water is supplied with the purpose of lubrication and cooling between a rolling roll and a rolled material, a periphery of the bearing of the roll neck part is in a use environment surrounded by a large quantity of rolling water. Since the supply of rolling water is usually a harsh condition for a seal device for waterproof attached to a bearing, housing or the like, it is difficult to completely prevent intrusion of rolling water into the bearing.

Also, since abrasion powder caused by contact between the rolling roll and a rolled material or scale falling from the rolled material and the like reaches a seal part with the large quantity of rolling water, it is a condition in which the seal itself can be worn easily. Therefore, it is difficult to completely prevent intrusion of the rolling water into the bearing by a seal device and the like.

Moreover, in the rolling roll, abrasion is caused on its surface by contact or friction with the rolled material as use progresses. Thus, when the roll is used for about several hours, it is removed with the bearing on from the rolling machine main body and replaced with a repaired rolling roll (with bearing on). The rolling roll removed from the rolling machine is repaired such as polishing on the surface with regard to the roll, but the attached bearing is not maintained or the like in usual.

A period from when the rolling roll is removed till when it is reused might reach several days depending on the number of rolling rolls in stock or operating state of the facility. That is, the bearing might be left for several days in a state with the rolling water intruding inside. Thus, so-called "season rust" might occur inside the bearing. Since the rolling roll is usually placed horizontally (laterally placed), the rolling water can easily remain at a lower part of an outer ring raceway surface and the rust can easily occur particularly on the outer ring raceway surface of that portion and the surface of a rolling element located at that portion. Also, such season rust can easily occur when the rolling machine of the steel facilities is stopped for a long time.

If such season rust occurs, not peeling life from inherent material fatigue but life caused by peeling starting at the rust on the surface becomes predominant in the bearing life, which makes the life short. Also, the bearing with the season rust developed has such damages with a high probability and has a short life. If such damage occurs during rolling, dimensional accuracy or appearance of the rolled material is adversely affected naturally and its cost burden becomes huge.

As the bearing at the roll neck part of such rolling machine, a tapered roller bearing or cylindrical roller bearing are used with a single- or multi-row. Particularly, a tapered roller bearing with four rows on one side is used in many cases.

Moreover, steel continuous casting facility, for example (hereinafter described as continuous caster in some cases), is a facility for manufacturing a steel plate product called slab/billet/bloom. A peripheral environment of a bearing supporting its guide roll (some have axle box) becomes a high temperature since a red-hot cast piece in a solidification process passes the vicinity of the bearing. Also, cooling water supplied for cooling the cast piece becomes a high-temperature steam (the cooling water is immediately changed to steam due to the high-temperature environment), and the environment is surrounded by the high-temperature steam. Also, the bearing might be directly splashed with the cooling water.

Thus, in a seal provided at the bearing of the guide roll part or the seal provided at the axle box, it is difficult to completely prevent intrusion of moisture such as steam and cooling water into the bearing. Also, the seal itself can easily wear due to the high-temperature environment.

The continuous caster is usually stopped for several days a month for facility inspection. At this time, the season rust can easily develop similarly to the bearing of the roll neck part of the above-mentioned rolling machine. If the facility is operated again with the season rust developed, peeling with the rust as a starting point is caused. Also, in the case of need to repair due to abrasion of the roll and the like in the continuous caster, an entire unit called segment constituted by a plurality of rolls is replaced. The bearing used in the replaced segment is overhauled and those without damage or the like are reused. However, if it is left for a long time till overhaul, the season rust might occur at the outer ring raceway surface and the rolling element similarly to the bearing at the roll neck part of the rolling machine. Those with the season rust developed are required to be replaced, which makes a factor to increase the cost.

In these continuous casters, self-aligning roller bearing or a tapered roller bearing, cylindrical roller bearing provided with an aligning housing ring at the outer ring or inner ring are used in many cases.

From the above, in order to reduce costs such as repairing cost of the bearing, bearings resistant against rust are in demand.

In order to suppress development of the season rust, means of mounting double and triple seals to prevent intrusion of water by sacrificing a load capacity of the bearing, which makes a main factor in rolling fatigue life, means of applying chemical conversion treatment such as phosphate coating on the whole surface of the bearing, means of forming a metal coating made of zinc and the like by electric plating and the like have been employed.

In the bearing used in the rolling machine and continuous caster, other than the above problem of the season rust, there is a following problem relating to the damage of the bearing. That is, if the rolling water and the like intrude into the bearing during use, a lubrication state is deteriorated, the rolling element slips on the raceway surface, and the raceway surface and the surface of the rolling element might be damaged. The damage modes are represented by abrasion, peeling, smearing and surface damage called galling.

For example, rolling might be conducted in the rolling machine while rapid acceleration/deceleration are repeated at a rolling velocity in a range from approximately 100 m/min to approximately 2500 m/min. Moreover, the rolling machine is used in a wide range of conditions from a low speed to a high speed or from a light load to a heavy load such that an impact load is applied when the rolled material enters between the rolls, a heavy load is applied exactly when the rolled material is passing between the rolls, and rotation might be under a light load condition that slip occurs at a roller of the bearing after the rolled material has passed between the rolls. Thus, if water intrudes into the bearing and the lubrication state inside the bearing is deteriorated, damage such as peeling, smearing, galling and the like might occur depending on the use condition and the like. For example, in the use under the condition of high speed and heavy load, peeling or galling caused by oil film shortage easily occurs, in the use under the condition of high speed and light load, smearing caused by slide of a roller can easily occur, and in the use under the condition of low speed and heavy load, abrasion easily occurs.

These problems also apply to the bearing of a facility used around the continuous caster or rolling machine. For example, the same applies to the bearing of a table roller installed before and after the rolling roll of the rolling machine. As the bearing of the table roller, a cylindrical roller bearing provided with an inner ring or outer ring in the form divided into two parts is used in many cases.

As a solution to these problems, improvement of a material resistant to damage on the surface such as abrasion and the like has been proposed as described in Patent Document 5.

However, in the case of the roll neck bearing in the rolling machine operated under the harsh condition, even if a seal to prevent intrusion of water is mounted, it is not always possible to completely prevent the water intrusion, and prevention of rust development even if water intrudes is in demand.

Also, since a chemical conversion coating such as manganese phosphate coating and the like is a corrosion coating, it corrodes a base material to some degree. Thus, if the chemical conversion coating is applied on the raceway surface of the bearing, peeling occurs from that portion as a starting point depending on the degree of the corrosion, and duration of life is reached earlier than rust development life in the case where chemical conversion coating is not applied in some cases.

Moreover, in a method by electroplating or chemical plating, if the base material is steel, hydrogen intrudes into the steel product in a plating process, reduction or management of a possibility to cause local hydrogen embrittlement is difficult, and it is hard to ensure sufficient reliability of the rolling device.

Moreover, in the chemical conversion coating, if a degree of corrosion into the base material is to be reduced, a crystal size of the coating is affected, and the chemical conversion coating becomes easy to drop due to rolling. As a result, an oil maintaining power is lowered and the like after the rolling and rust development life cannot be elongated, which is a problem.

Moreover, in the electroplating or chemical plating method, acid cleaning as pre-treatment and baking as post-treatment cannot be avoided. Therefore, labor and costs are tremendous for process control to minimize hydrogen intrusion into the steel product in the acid cleaning process and thermal influence on the thermally treated steel product due to baking and moreover, process control including treatment of discharged water and the like used for the plating.

Moreover, in the electroplating or chemical plating method, as a feature specific to the plating, a micro defect such as a pinhole and the like can be easily formed on a plated layer, and without forming a relatively thick coating in order to prevent this defect, a sufficient rust-proof effect cannot be obtained easily. However, with the relatively thick coating, the plated layer itself can be easily peeled off and moreover, there is a problem that ensuring of bearing accuracy such as a gap inside the bearing and the like becomes difficult.

According to molten metal plating, the above problems of waste water and the like are fewer, but since treatment at a melting point or above of the metal forming the coating is indispensable, thermal influence on the steel product as the base material is unavoidable, and tempering or dimensional change of the thermally treated steel product can easily occur. Also, since the molten metal plating has a relatively thick coating, peeling-off or dimensional change easily occurs.

Thus, the present invention solves the problems as above of the prior art and has an object to provide a rolling device in which rust development or damage on the raceway surface or rolling surface hardly occurs even if water and the like intrudes.

Patent Document 1: JP-A-2002-106588
Patent Document 2: JP-A-2003-239992
Patent Document 3: JP-A-09-329147
Patent Document 4: JP-A-11-132229
Patent Document 5: JP-A-10-184700
Patent Document 6: JP-A-05-240256
Patent Document 7: JP-A-2002-139052
Patent Document 8: JP-A-2002-147473

DISCLOSURE OF THE INVENTION

In order to solve the above problems, the present invention comprises as follows. That is, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by mechanical energy, and the metal coating is composed of metal less noble than iron.

Also, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with metal coating formed at least on a part of its surface by shot peening of a powder of metal less noble than iron.

By coating the surface with the metal coating composed of metal less noble than iron, which is a main component of a metal material (hereinafter referred to as base material depending on the case) constituting the inner member, outer member, rolling elements, the metal less noble than iron begins to dissolve away with priority even under an environment where rust can easily develop (self-sacrificing rust-proofing action), rust development in the inner member, outer member, rolling elements can be suppressed. Also, since the metal coating is formed using mechanical energy, corrosion or hydrogen embrittlement, which causes a problem in conventional coating methods such as chemical conversion treatment or plating, will not occur. Also, the metal coating formed using mechanical energy is firmly brought into close contact with the surface of the base material and is hardly peeled off. As a method of forming a metal coating using mechanical energy, shot peening in which a powder of metal less noble than iron is blown out is preferable since the metal coating can be formed easily and in a short time. Also, a method such as shot blast or mixed treatment such as ball mill, barrel treatment and the like by adding an appropriate medium to a powder of metal less noble than iron can be also employed as a method of forming a metal coating using mechanical energy.

In the above rolling device according to the present invention, the metal less noble than iron preferably contains at least any one of aluminum, zinc, bismuth. If the metal coating contains the above metal, the rust-proof properties of the metal coating become excellent. The metal less noble than iron in the present invention is not limited to those made of one type of metal but includes a mixture or alloy made of a plurality of metals less noble than iron.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by mechanical energy, and the metal coating is in a double-layer structure in which a coating composed of metal less noble than iron as an inner layer and a coating composed of metal equal to or nobler than iron as a surface layer.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by mechanical energy, and the metal coating is an alloy coating obtained by alloying a coating composed of metal less noble than iron by metal equal to or nobler than iron.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by mechanical energy, and the metal coating is composed of metal less noble than iron and metal equal to or nobler than iron and has a structure that a proportion of the metal less noble than iron is gradually decreased, and the proportion of the metal equal to or nobler than iron is gradually increased from the base material side toward the surface side.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by shot peening of a powder of metal, and the metal coating is in a double-layer structure of an inner layer formed by shot peening of a powder of metal less noble than iron and a surface layer formed on the inner layer by shot peening of a powder of metal equal to or nobler than iron.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by shot peening of a powder of metal, and the metal coating is formed by applying shot peening of a powder of metal equal to or nobler than iron to a coating formed by shot peening of a powder of metal less noble than iron, and the metal coating is an alloy coating made of an alloy of the metal less noble than iron and the metal equal to or nobler than iron.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by shot peening of a powder of metal, and the metal coating is formed by applying shot peening of a powder of metal equal to or nobler than iron to a coating formed by shot peening of a powder of metal less noble than iron and has a structure that a proportion of the metal less noble than iron is gradually decreased, and the proportion of the metal equal to or nobler than iron is gradually increased from the base material side toward the surface side.

By forming a coating on a base material by shot peening of a powder of metal less noble than iron and then applying shot peening of a powder of metal equal to or nobler than iron to this coating, the metal coating containing the metal less noble than iron and the metal equal to or nobler than iron is formed. Since the metal nobler than iron is hard to be corroded, rust development of the outer member, inner member, rolling elements is suppressed by the rust-proof properties.

At this time, the metal coating may have a double-layer structure with an inner layer composed of the metal less noble than iron and a surface layer composed of the metal equal to or nobler than iron. Alternatively, the metal coating may be an alloy coating made of an alloy of the metal less noble than iron and the metal equal to or nobler than iron. This alloy is formed by applying shot peening of a powder of the metal equal to or nobler than iron to the coating composed of the metal less noble than iron.

Moreover, the metal coating may have a structure (hereinafter referred to as complex structure depending on the case) in which, from the base material side toward the surface side, a proportion of the metal less noble than iron is gradually decreased and the proportion of the metal equal to or nobler than iron is gradually increased. Such complex structure is formed by applying shot peening of a powder of the metal equal to or nobler than iron to the coating composed of the metal less noble than iron.

In the case of a sea-island structure of the metal less noble than iron and the metal equal to or nobler than iron, the similar rust-proof properties can be obtained. If two or more of the double-layer structure, alloy, complex structure and sea-island structure are provided, the similar rust-proof properties can be also obtained. Moreover, as a method of forming the metal coating using mechanical energy other than shot peening, a method of mixed processing such as ball mill and the like by adding an appropriate medium to a powder of the metal less noble than iron can be employed.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by shot peening of a powder of metal, and the metal coating is an alloy coating formed by shot peening of a powder of an alloy of the metal less noble than iron and the metal equal to or nobler than iron.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed at least on a part of its surface by shot peening of a powder of metal, and the metal coating is an alloy coating formed by shot peening of a mixed powder of a powder of the metal less noble than iron and a powder of the metal equal to or nobler than iron.

By applying the shot peening of a powder of an alloy of the metal less noble than iron and the metal equal to or nobler than iron or shot peening of a mixed powder of the powder of the metal less noble than iron and the powder of the metal equal to or nobler than iron to the base material, the rust-proof properties can be further improved. The coating composed of the metal less noble than iron may be formed on the base material in advance by the method of forming the metal coating using mechanical energy such as shot peening and the like, and the shot peening as above may be further applied to the coating.

In the rolling device as above according to the present invention, the metal less noble than iron preferably contains at least one of aluminum, zinc, bismuth, and chromium, and the metal nobler than iron preferably contains at least one of nickel, copper, titanium, and tin. If the metal coating contains the metal as above, the rust-proof properties of the metal coating become excellent. The metal less noble than the iron in the present invention is not limited to those made of a single type of metal but may be a mixture or an alloy made of a plurality of metals less noble than iron. The same applies to the metal nobler than iron. The metals equal to iron include iron, alloys having iron as its main component, and alloys made of metal other than iron and equivalent to iron.

Moreover, in the rolling device according to the present invention, a thickness of the metal coating is preferably 0.05 μm or more and 8 μm or less. If the thickness of the metal coating is less than 0.05 μm, there is a fear that a sufficient and sustainable rust-proof effect cannot be obtained. On the other hand, if the thickness of the metal coating exceeds 8 μm, the metal coating might easily peel off, which might become a foreign substance to the rolling device. Moreover, it becomes difficult to make uniform metal coating and there is a possibility that various dimensional accuracies of members coated with the metal coating, internal gaps in the rolling device and the like may be fluctuated.

The metal coating in the present invention also has an action as a solid lubricant and particularly has an effect to reduce smearing in a large-sized bearing or abrasion on a rolling surface due to differential slip in a large-sized bearing. In view of this effect, the thickness of the metal coating is preferably 0.1 μm or more and 6 μm or less. If it is less than 0.1 μm, the abrasion reduction effect cannot be fully exerted, while if it exceeds 6 μm, the metal coating can easily peel off under a use condition in which smearing or differential slip occurs in a usual rolling device, which conversely ruins the effect.

Moreover, if the thickness of the metal coating is 0.1 μm or more and 5 μm or less (most preferably 0.1 μm or more and 3 μm or less), by a synergic action of the rust-proof effect and lubrication effect, even if water intrudes, rust hardly develops and lubrication on the raceway surface and rolling surface can be held favorable. Particularly, for prevention of smearing and differential slip of a large-sized bearing and rust-proof effect, the thickness of the metal coating is preferably 0.1 μm or more and 2 μm or less.

Moreover, the rolling device according to the present invention in order to solve the above problem is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed by zinc and tin at least on a part of its surface, and this metal coating is formed by shot-blast of zinc powder after shot-blast of tin powder.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed by zinc and tin at least on a part of its surface, and this metal coating is formed by shot-blast of a mixed powder of the zinc powder and the tin powder.

Moreover, the rolling device according to the present invention is a rolling device comprising an inner member having a raceway surface on an outer surface, an outer member having a raceway surface opposing the raceway surface of the inner member and arranged outside the inner member, and a plurality of rolling elements arranged rotatably between the both raceway surfaces, in which at least any one of the inner member, the outer member, and the rolling elements is provided with a metal coating formed by zinc and tin at least on a part of its surface, and this metal coating is formed by shot-blast of a powder of an alloy of zinc and tin.

In the rolling device provided with the metal coating formed by such shot-blast, a content of zinc contained in the metal coating is preferably 5 mass % or more and 80 mass % or less and a content of tin is preferably 95 mass % or less and 20 mass % or more. It is more preferable that the content of zinc contained in the metal coating is 5 mass % or more and 45 mass % or less and the tin content is 95 mass % or less and 55 mass % or more and it is further preferable that the zinc content is 5 mass % or more and 35 mass % or less and the tin content is 95 mass % or less and 65 mass % or more.

Also, in these rolling devices, a constituent member provided with the metal coating among the inner member, the outer member, and the rolling elements is constituted by steel and hydrogen concentration in the steel is preferably 0.5 ppm or less.

Moreover, the rolling device according to the present invention may be a self-aligning roller bearing, cylindrical roller bearing, or tapered roller bearing used in steel facilities.

The continuous caster is constituted, as shown in FIGS. 5 to 7, by combining ten and several sets of units called segments in which a plurality of (approximately 10 to 30) guide rolls 50 and bearings 51 (and axle boxes) for guide roll are arranged vertically. Casting is started by pouring molten steel (cast piece) between the upper and lower guide rolls from the segment on the upstream side, the cast piece is gradually solidified from the surface of the cast piece by supplying cooling water to the cast piece, and after the cast piece passes through the final segment, a steel-plate product called slab/billet/bloom is completed.

Since the cast piece should be solidified slowly, the guide roll 50 (bearing 51) is used at an extremely low speed of approximately 1 to several rpm. Also, in order to roll down expansion of the cast piece in the solidification process by the guide roll 50, a large reaction force (load) acts on the guide roll 50 (bearing 51). Thus, the guide roll 50 is brought into a state with a large deflection (bending) generated.

The peripheral environment of the bearing 51 (axle box) supporting the guide roll 50 becomes a high temperature since the red-hot cast piece during the solidification process passes near the bearing, and the environment is also surrounded by steam generated by evaporation of cooling water due to the high-temperature environment.

As mentioned above, since the bearing for guide roll used in the continuous caster is used in an environment of high load, extremely low speed and steam, a sufficient oil film is hard to be formed between the rolling element and the raceway surface, and the bearing is used in an extremely harsh lubrication condition.

Since the guide roll is deflected (inclined), the self-aligning roller bearing is often used as the bearing for guide roll so that the inclination of the shaft can be allowed for. However, since differential slip can easily occur inside the bearing at the self-aligning roller bearing due to its mechanism, if it is used in the harsh lubrication condition such as the continuous caster, there is a fear that extreme abrasion occurs on the raceway surface of the outer ring and as a result, early peeling-off is caused. On the other hand, the cylindrical roller bearing and tapered roller bearing in which differential slip does not occur inside the bearing has poor aligning performance with respect to the inclination of the shaft.

Therefore, the self-aligning roller bearing is constituted by steel in which abrasion is hard to occur even if lubrication is poor, while the cylindrical roller bearing or tapered roller bearing is made capable of allowing for the inclination by providing an aligning housing ring on an outer diameter surface of the outer ring so as to solve the above problem.

However, since the bearing for guide roll used in the continuous caster is used under the above-mentioned steam environment, it is difficult to completely prevent intrusion of water into the bearing. Also, since the continuous caster usually needs to be stopped for several days a month for overhaul, steam is condensed in the bearing due to temperature drop at the overhaul, and rust develops under the influence, which is a problem. As a result, there is a fear that peeling-off occurs starting from the rust at the same time as resumption of operation.

Also, if the guide roll reaches its life, the segment is removed from the continuous caster for replacement of the guide roll, but since the number of guide rolls is large, guide rolls and bearings need to be stored for approximately several weeks to a month, and season rust develops during the storage in some cases.

Among the causes for disposal of the bearing for guide roll in the continuous caster at a steel plant, the rust accounts for a large proportion. Thus, in order to reduce repair costs of the bearing for guide roll, a bearing in which rust is hard to develop is in demand.

The bearing used in the steel facilities is mainly used for applications supporting a roll or supporting a table roller in the continuous casting facilities. And it is used under a condition of high temperature and in which cooling water can easily intrude into the bearing and it is driven at various speeds from a low speed to a high speed under a high load. Since the roller bearing as above in the rolling device according to the present invention is provided with the metal coating as mentioned above, even if it is used for the above applications under the above conditions, not to mention the season rust but any rust is hard to develop in use. Also, improvement of abrasion prevention performance, that is, lubrication performance under the condition in which water can easily intrude is recognized in the above applications more remarkably than in general usages.

Moreover, in the roller bearing as above in the rolling device according to the present invention, at least either one of the inner ring and the outer ring may be divided into two or more parts in the circumferential direction. Moreover, the roller bearing as above in the rolling device according to the present invention, an aligning housing ring may be provided at the inner ring or the outer ring. The aligning housing ring may be divided into two or more parts in the circumferential direction. These roller bearings are a bearing form suitable for steel facilities or particularly a roll neck part of a rolling machine, a guide roll of a continuous caster, and a table roller of a rolling machine, and the above effect is exerted more remarkably in them than in the general-form bearings.

Moreover, the roller bearing as above in the rolling device according to the present invention may be provided with a seal or a seal device. By providing a seal or a seal device, the above effect is expected to be improved. Moreover, the roller bearing as above in the rolling device according to the present invention may be used in a single row or in multi rows by combining a plurality of the bearings. These roller bearings are a bearing form suitable for steel facilities or particularly a roll neck part of a rolling machine, a guide roll of a continuous caster, and a table roller of a rolling machine, and the above effect is exerted more remarkably in them than in the general-form bearings.

Moreover, the rolling device according to the present invention may be a deep-groove ball bearing, angular contact ball bearing, cylindrical roller bearing, tapered roller bearing or needle roller bearing used in an agricultural machine, paper manufacturing machine, multi-purpose four-wheel buggy, or construction machine. Since the bearing used in the agricultural machine, paper manufacturing machine, multi-purpose four-wheel buggy or construction machine might be used in water, water might intrude inside even if a mechanical seal is attached, but if the metal coating as above is provided, even if water intrudes, rust is hard to develop. Also, improvement of abrasion prevention performance, that is, lubrication performance under the condition in which water can easily intrude is recognized in the bearings of the above applications more remarkably than in general usages.

Moreover, the rolling device according to the present invention may be a deep-groove ball bearing, angular contact ball bearing, cylindrical roller bearing, tapered roller bearing or 4-point contact ball bearing used in a water-lubrication compressor. These bearings are mainly used as a bearing supporting a main shaft of the water-lubrication compressor and even if a mechanical seal is attached, water might intrude into the bearing, but if the metal coating as above is provided, even if water intrudes, the rust is hard to develop. Also, improvement of abrasion prevention performance, that is, lubrication performance under the condition in which water can easily intrude is recognized in the bearings of the above applications more remarkably than in general usages.

Moreover, the rolling device according to the present invention may be a self-aligning roller bearing, cylindrical roller bearing, tapered roller bearing, or ball bearing used in mine facilities. These bearings are mainly used as a bearing supporting a main shaft of shaking sieve, pulverizer, and crusher, which are mine facilities and a bearing supporting rollers of conveying devices (conveyer), and they are used under a condition subjected to dusts, rain and the like in many cases and moreover, driven at various speeds from low to high under a vibration impact. Thus, water can easily intrude into the bearing but if the bearing is provided with the above metal coating, rust can hardly develop even in the case of water intrusion. Also, improvement of abrasion prevention performance, that is, lubrication performance under the condition in which water can easily intrude is recognized in the bearings of the above applications more remarkably than in general usages.

Moreover, the rolling device according to the present invention may be a deep-groove ball bearing, angular contact ball bearing, or cylindrical roller bearing used in a pump. These bearings are mainly used as a bearing supporting a main shaft of a pump, and when the pump handles water, even if a mechanical seal is attached, water might intrude into the bearing. However, if the above metal coating is provided, rust can hardly develop even in the case of water intrusion. Also, improvement of abrasion prevention performance, that is, lubrication performance under the condition in which water can easily intrude is recognized in the bearings of the above applications more remarkably than in general usages.

The present invention can be applied to various rolling devices. For example, they include rolling bearing, ball screw, linear guide device, linear bearing and the like. The inner member in the present invention refers to an inner ring if the rolling device is a rolling bearing, a screw shaft in the case of a ball screw, a guide rail in the case of a linear guide device, and a shaft in the case of a linear bearing, respectively. Also, the outer member refers to an outer ring if the rolling device is a rolling bearing, a nut in the case of the ball screw, a slider in the case of the linear guide device, and an outer cylinder in the case of the linear bearing, respectively.

Moreover, the rolling bearing according to the present invention to solve the above problem comprises an inner ring, an outer ring, a plurality of rolling elements rotatably disposed between the inner ring and the outer ring, a corrosion-resistant coating formed by shot peening of a solid lubricant having a rust-proof effect on the surface of at least either one of the inner ring and the outer ring, and a conductive grease provided between the inner ring and the outer ring.

In this rolling bearing, the corrosion-resistant coating is preferably provided with a first layer coating formed by shot peening of Zn as a shot media and a second layer coating formed by shot peening of Sn as a shot media. Also, in this rolling bearing, the thickness of the above corrosion-resistant coating is preferably 0.5 μm or more and 5 μm or less.

Moreover, this rolling bearing may be a bearing with a locating snap ring, a bearing with conductive heat-insulating bush, a flanged bearing or a resin wrap bearing. Moreover, the rolling bearing may be a bearing for office equipment.

BRIEF DESCRIPTION OF THE DRAWINGS

FIG. 11 is a view of a four-row tapered roller bearing incorporated in a roll neck part;

FIG. 25 is a sectional view illustrating outline configuration of a rolling bearing according to a fifth embodiment;

FIG. 27 is a table illustrating an evaluation result of the rolling bearing according to the fifth embodiment;

FIG. 28 is a graph illustrating a rust test result of the rolling bearing according to the fifth embodiment;

BEST MODE FOR CARRYING OUT THE INVENTION

First Embodiment

Figure 1:
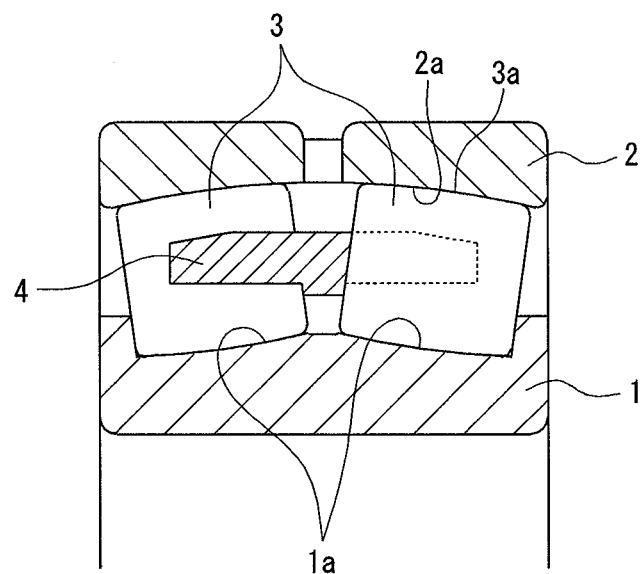
FIG. 1 is a partial longitudinal sectional view illustrating a structure of a self-aligning roller bearing, which is a first embodiment of the rolling device according to the present invention.

An embodiment of the rolling device according to the present invention will be explained in detail referring to the attached drawings. FIG. 1 is a partial longitudinal sectional view illustrating a structure of a self-aligning roller bearing, which is a first embodiment of the rolling device according to the present invention.

This self-aligning roller bearing comprises an inner ring 1 (inner member), an outer ring 2 (outer member), two rows of convex rollers 3 arranged capable of rolling between the inner ring 1 and the outer ring 2, and a cage 4 for holding the convex roller 3 between the inner ring 1 and the outer ring 2, and a lubricant, not shown, is arranged in a space formed between the inner ring 1 and the outer ring 2.

On an outer peripheral surface of the inner ring 1, two rows of the raceway surfaces 1a and 1a of the convex rollers 3 are formed. And in a portion of which the raceway surfaces 1a and 1a are formed among the outer peripheral surface of the inner ring 1, its outer diameter is formed larger on the center portion than the both end portions in the width direction. Further, an inner peripheral surface of the outer ring 2 consists a spherical raceway surface 2a opposing two rows of the raceway surfaces 1a and 1a. And at least one of the inner ring 1, the outer ring 2, and the rolling elements 3 comprises a metal coating (not shown) formed at least on a part of its surface by shot peening of a powder of metal less noble than iron.

In such self-aligning roller bearing, since the metal less noble than iron constituting the metal coating dissolves away with priority even under an environment where rust can easily develop, rust development of the inner ring 1, the outer ring 2, and the rolling elements 3 is suppressed. Also, since the metal coating is formed using mechanical energy, corrosion or hydrogen embrittlement, which becomes a problem in chemical conversion treatment or plating, which is a conventional coating forming method, does not occur.

A spot where the metal coating is to be formed is not particularly limited as long as it is on the surface of the inner ring 1, the outer ring 2, and the rolling elements 3, and rust development on the spot where the metal coating is formed can be suppressed. By forming metal coating at least on one of the raceway surface 1a of the inner ring 1, the raceway surface 2a of the outer ring 2, and a rolling surface 3a of the rolling element 3, the rust development on these surfaces can be suppressed, and a life of the self-aligning roller bearing can be prolonged. Also, since the metal coating has lubricating property, the lubricating property of the self-aligning roller bearing can be improved and the life can be prolonged.

Shot peening of a powder of metal equal to or nobler than iron may be applied to the metal coating constituted by the metal less noble than iron so as to have a metal coating constituted by the metal less noble than iron and the metal equal to or nobler than iron. The metal coating obtained at this time may be in a double-layer structure of an inner layer constituted by the metal less noble than iron and a surface layer constituted by the metal equal to or nobler than iron and formed on the inner layer, or it may be an alloy coating made of an alloy of the metal less noble than iron and the metal equal to or nobler than iron. Alternatively, it may have a complex structure in which a proportion of the metal less noble than iron is gradually decreased from the base material side toward the surface side, while the proportion of the metal equal to or nobler than iron is gradually increased.

The alloy coating made of the alloy of the metal less noble than iron and the metal equal to or nobler than iron may be formed by shot peening of a powder of the alloy of the metal less noble than iron and the metal equal to or nobler than iron or may be formed by shot peening of a mixed powder of a powder of the metal less noble than iron and a powder of the metal equal to or nobler than iron.

The metal less noble than iron preferably contains at least one of aluminum, zinc, bismuth, and chromium. The metal nobler than iron preferably contains at least one of nickel, copper, titanium, and tin. Moreover, the thickness of the metal coating is preferably 0.05 µm or more and 8 µm or less.

In the rolling device such as this self-aligning roller bearing, it is preferable that a dimple with a depth of 0.1 µm or more and 5 µm or less is provided at a portion at least coated with the metal coating in the surface of the inner member (inner ring 1), the surface of the outer member (outer ring 2), and the surface of the rolling element (rolling element 3), and the metal coating is provided by shot peening on the surface where the dimple is formed.

Even in the case where the dimple is formed on the surface of the base material or even if it is not formed, the surface roughness of the base material before coating with the metal coating is preferably 0.001 µmRa or more and 10 µmRa or less. If the surface roughness of the base material is less than 0.001 µm, adhesion between the metal coating and the base material might be lowered, while if the roughness exceeds 10 µmRa, there is a fear that the lubricating property improvement effect by the metal coating cannot be obtained.

The surface roughness of the base material before being coated with the metal coating is preferably 0.01 µmRa or more and 5 µmRa or less, more preferably 0.01 µmRa or more and 3 µmRa or less, particularly preferably 0.01 µmRa or more and 1 µmRa or less, or most preferably 0.1 µmRa or more and 0.5 µm or less.

The thickness of the metal coating is preferably approximately twice to four times of a numerical value of the surface roughness of the base material indicated by center-line average roughness (unit is µm). Within this range, adhesion is good and both the rust-proof effect and lubrication effect can be appropriately obtained.

Moreover, the preferable surface roughness (roughness of the outermost surface) of the metal coating is different depending on a portion coated with the metal coating, and it is only necessary that the roughness is in a range not damaging its function but the roughness is preferably 10 µmRa or less. For example, the roughness on the raceway surface, the rolling surface, the sliding surface or the fitting surface with another member is preferably 10 µmRa or less. Particularly in the case of the raceway surface, the rolling surface and the sliding surface, it is preferably 5 µmRa or less, more preferably 3 µmRa or less, further preferably 1 µmRa or less, or most preferably 0.5 µmRa or less. In the present invention, since the metal coating coats the base material using the mechanical energy, the surface roughness of the metal coating is subjected to the surface roughness of the base material. Thus, by controlling the surface roughness of the base material, the surface roughness of the metal coating can also be controlled.

Particularly, if the rolling device is a self-aligning roller bearing used in steel facilities, a cylindrical roller bearing provided with an aligning housing ring at an outer ring, a tapered roller bearing provided with the aligning housing ring at the outer ring, the surface roughness of the metal coating on the raceway surface or the rolling surface is preferably 0.01 µmRa or more and 5 µmRa or less, more preferably 0.01 µmRa or more and 3 µmRa or less, further preferably 0.01 µmRa or more and 1 µmRa or less, or most preferably 0.01 µmRa or more and 0.5 µm or less. Within this range, so-called breaking-in at the beginning of use is favorable and durability as a rust-proof coating, lubricating coating becomes favorable. If the surface roughness of the metal coating is too favorable, there is no room for a lubricant, moisture and the like to interpose microscopically, which seems to cause direct contact between the metal coating and the counterpart side and adhesion and the like.

In the rolling device of the present invention, it is not particularly necessary for the two surfaces in contact such as the raceway surface and the rolling surface to be provided with the metal coating in the same composition. If the two surfaces in contact are provided with metal coatings made of different metals or different alloys, an effect to prevent adhesion of the metal coating caused by so-called similar composition metal phenomenon can be expected.

Moreover, in the rolling device of the present invention, since its rust-proof action is so-called self-sacrificing corrosion resistance, if the metal coating is partially formed, the rust-proof effect can be obtained. However, on a portion where the lubricating action is required, that is, on the rolling contact surface such as raceway surface, rolling surface and the like and sliding surface, the metal coating preferably covers an area of 50% or more of its surface.

If the coverage of the metal coating is less than 50% from the beginning, so-called breaking-in does not progress preferably but there is a possibility that the metal coating drops due to rolling or sliding and the effect is not exerted. Particularly if the rolling device is used with a high load such as in the case of the self-aligning roller bearing used in steel facilities, cylindrical roller bearing provided with an aligning housing ring at an outer ring, a tapered roller bearing provided with the aligning housing ring at the outer ring, the possibility becomes high.

The coverage of the metal coating is more preferably 75% or more, further preferably 85% or more, particularly preferably 95% or more, or most preferably 100%. Even if a portion other than the rolling surface or the sliding surface is coated with the metal coating, in view of durability of the self-sacrificing corrosion resistance effect, the coverage of the metal coating is preferably 50% or more, more preferably 75% or more, further preferably 85% or more, particularly preferably 95% or more, or most preferably 100%.

Since the coating by the metal coating is performed using the mechanical energy, it has an advantage that a part of a member can be easily coated. Particularly in the case of shot peening, shot only for a required portion by adjusting an injection nozzle is easy. Also, in this case, since masking from the mechanical energy is only necessary, it is considerably more excellent in quality stability, costs and the like than chemical conversion treatment, electric plating or chemical plating which require masking from chemical treatment solution or generated gas. Specifically, it is possible that a masking member is placed or an unnecessary metal coating can be removed by mechanical means such as grinding, cutting and the like.

The thickness of the metal coating is preferably measured by a method of acquiring from a dimensional difference before and after the coating processing of the metal coating, which is easy and accurate, if a thickness dimension, inner diameter dimension, outer diameter dimension of a member can be measured by a micrometer, dial gauge, air micrometer and the like, for example. It may also be measured by electromagnetic or ultrasonic nondestructive coating thickness measuring device. Moreover, the thickness may be measured by cutting out a section of the metal coating and enlarging it using an optical microscope or electronic microscope. If the electronic microscope is used, in order to avoid influence on extremely microscopic measurement of unevenness, a section of a predetermined length (100 µm, for example) is divided into five parts or the like with an equal interval in the sectional direction and the thickness of the metal coating on the base material which can be acquired on the five lines or the like is measured. Approximately 50 measurement values can be obtained by repeating this procedure approximately ten times, and an average value of them may be a thickness of the metal coating.

The coverage of the metal coating indicates how much of the base material with a predetermined unit area is coated. This coverage can be measured by visual observation with an optical microscope or by electronically processing an image obtained by the optical microscope. In addition, the value can be obtained by combining an electronic microscope and electron micro analyzer to obtain approximately 50 measurement values (X-ray intensity of the coating) on a predetermined unit area, averaging them and converting and calculating an average value to the coverage.

Moreover, the thickness of the metal coating can also be obtained from a mass difference before and after the coating processing. That is, in the metal coating by the mechanical energy, particularly the metal coating by shot peening, there are few defects but a mass is increased by an amount of the metal coating between before and after the coating processing, and the thickness of the metal coating can also be obtained from an area of a processed portion and a specific gravity of the metal coating by measuring the mass. This method is particularly effective if the coverage is less than 100%. In an example of zinc, the thickness 1 µm of the metal coating corresponds to 7.1 $g/m^2$. That is, since the specific gravity of zinc is 7.1, a preferable range of the thickness of the metal coating is 0.3 to 57 $g/m^2$, more preferably 0.7 to 43 $g/m^2$, further preferably 0.7 to 36 $g/m^2$, or most preferably 0.7 to 14.2 $g/m^2$.

The thickness and coverage of the metal coating can be controlled by setting various conditions when the metal coating is formed by the mechanical energy. The case of shot peening will be described below.

A grain size of a powder of the metal equal to or less noble than iron to be shot is preferably 100 µm or less on an average. Also, the maximum grain size is preferably 300 µm or less. That is, in the case of zinc, since the specific gravity is 7.1, the mass per shot material is preferably approximately 0.12 g or less. In the case of tin, since the specific gravity is 7.3, the mass per shot material is preferably approximately 0.13 g or less. The grain size of a metal powder is more preferably 20 µm or more and 100 µm or less, more preferably 20 µm or more and 60 µm or less, or most preferably 30 µm or more and 50 µm or less.

A shot pressure at shot peening is preferably 196 kPa or more and 1470 kPa or less, more preferably 392 kPa or more and 980 kPa or less, further preferably 392 kPa or more and 784 kPa or less, or most preferably 392 kPa or more and 588 kPa or less.

A shot speed at shot peening is preferably 100 m/s and more and 350 m/s or less, more preferably 100 m/s or more and 300 m/s or less, further preferably 100 m/s or more and 200 m/s or less, or most preferably 100 m/s or more and 150 m/s or less.

If the grain size, shot pressure, or shot speed of the metal powder exceeds each upper limit value, the surface roughness of the metal coating tends to become poor, while if the value is less than each lower limit value, the metal coating is hard to be formed.

It is preferable that all the processed surfaces are exposed to injection uniformly under the conditions as above. And a peening time is preferably 10 seconds or more, more preferably 10 seconds or more and 20 minutes or less, further preferably 20 seconds or more and 10 minutes or less, or most preferably 20 seconds or more and 5 minutes or less. If the peening time exceeds the upper limit value, the surface roughness of the metal coating tends to become poor, while if the time is less than the lower limit value, the metal coating is hard to be formed.

In the shot peening, the metal powder may be injected using air or may be injected using nitrogen or inert gas. A method of forming metal coating using mechanical energy represented by the shot peening has a secondary effect that a residual stress is generated in the base material. Moreover, in order to obtain such effect, shot peening of glass beads or SiC powder may be applied as pre-treatment. Furthermore, according to the method of forming metal coating using mechanical energy, high-temperature exposure by baking treatment indispensable in electric plating and the like does not have to be applied.

In order to effectively obtain the secondary effect, it is preferable that the base material is steel and hardness on the surface before coating processing of the metal coating by mechanical energy is 58 or more in HRc by predetermined heat treatment. And those obtained by applying heat treatment to a high-carbon chromium steel for bearing represented by SUJ2, SUJ3 so that a retained austenite amount on a surface layer portion is adjusted to 5 volume % or more and 40 volume % or less and the surface hardness to HRc 57 or more and 67 or less are more preferably used as the base material. Also, carburized steel such as SCM420, SCr420, SCM420H, SNCM420H, SNCM815 and the like and stainless material capable of heat treatment may be used as the base material. Moreover, each member constituting the rolling device does not have to be made of the same type of material but the rolling element and the inner member, the outer member may be made of different steel types, for example.

Moreover, the rolling device of the present invention may be provided with a cage, a sealing device or other accessory members, and the cage, sealing device or other accessory members may be coated by above-mentioned metal coating by mechanical energy.

Particularly if the cage, sealing device or other accessory members are made of steel, the same effect as above can be expected. In the case of the cage, it has at least a portion sliding with the rolling element, and lubrication and rust-proof effects can be expected, while in the case of the sealing device, it has a contact with an external environment, and rust-proof effect can be expected in a situation in contact with moisture. The same applies to a spacer and a separator.

Moreover in the rolling device of the present invention, if at least a side of the rolling device of a contact portion between the rolling device and another part outside the rolling device is coated by the above-mentioned metal coating, fretting prevention effect, which is a subordinate concept of the lubrication effect, can be expected.

Figure 2:
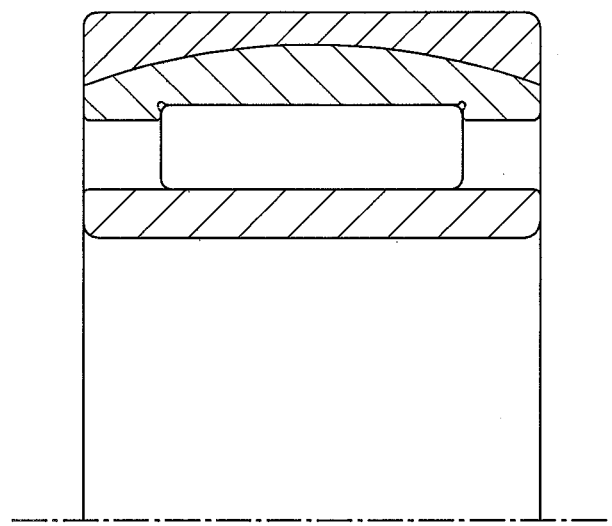
FIG. 2 is a partial longitudinal sectional view illustrating a structure of a cylindrical roller bearing, which is a variation of the first embodiment.
Figure 3:
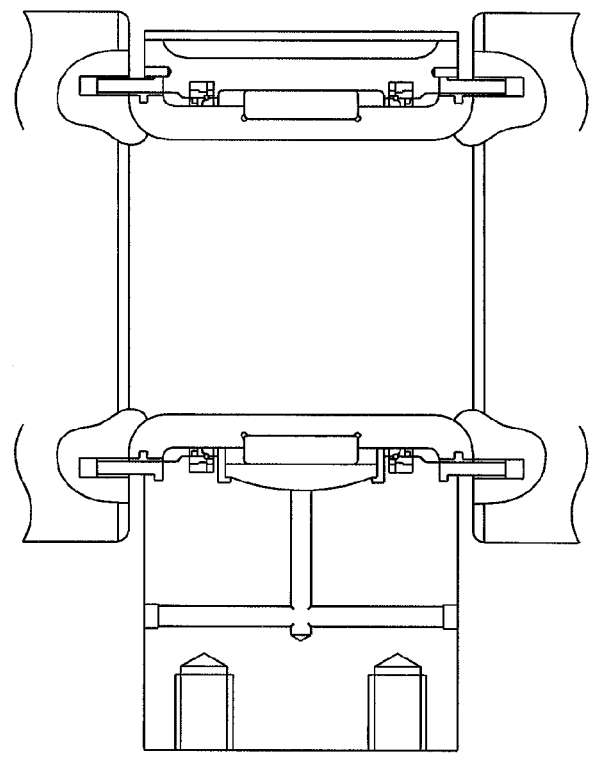
FIG. 3 is a partial longitudinal sectional view illustrating a structure of a cylindrical roller bearing, which is another variation of the first embodiment.
Figure 4:
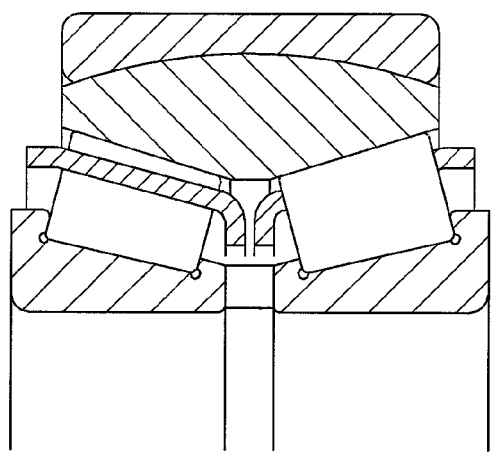
FIG. 4 is a partial longitudinal sectional view illustrating a structure of tapered roller bearing, which is another variation of the first embodiment.

In this embodiment, a self-aligning roller bearing has been explained as an example of a rolling device, but the type of the rolling bearing is not limited to the self-aligning roller bearing but the present invention can be applied to various types of rolling bearings. For example, they include radial type rolling bearing such as deep-groove ball bearing, angular contact ball bearing, self-aligning ball bearing, needle roller bearing, cylindrical roller bearing (a full-complement roller type cylindrical roller bearing provided with an aligning housing ring is shown in FIG. 2 and a split cylindrical roller bearing provided with an aligning housing ring is shown in FIG. 3), tapered roller bearing (a tapered roller bearing provided with an aligning housing ring and a cage is shown in FIG. 4) and the like and thrust type rolling bearing such as thrust ball bearing, thrust roller bearing and the like. Moreover, the present invention is not limited to rolling bearings but can be applied to various rolling devices of other kinds such as ball screw, linear guide device, linear bearing and the like.

An embodiment is shown below and the present invention will be explained in more detail.

[Rust-Proof Property Evaluation 1]

A bearing with configuration substantially similar to the self-aligning roller bearing in FIG. 1 except that any one of the inner ring, outer ring, roller, the cage (See Table 1) is coated with metal coating constituted by zinc by shot peening is prepared. The metal coating is applied on the whole surface of the member and the thickness is set at 0.1 to 1 µm. The shot peening was carried out by blowing out a metal powder with an average grain size of 45 µm at a shot pressure of 392 to 588 kPa and shot speed of 100 to 150 m/s for 30 to 60 seconds.

Figure 5:
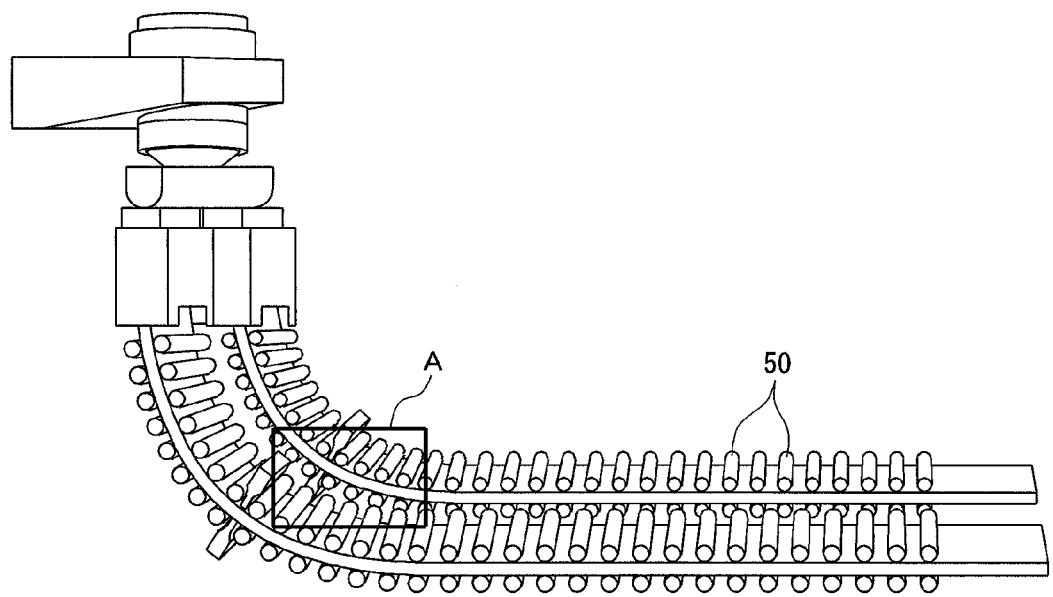
FIG. 5 is an outline view illustrating a structure of a continuous caster.
Figure 6:
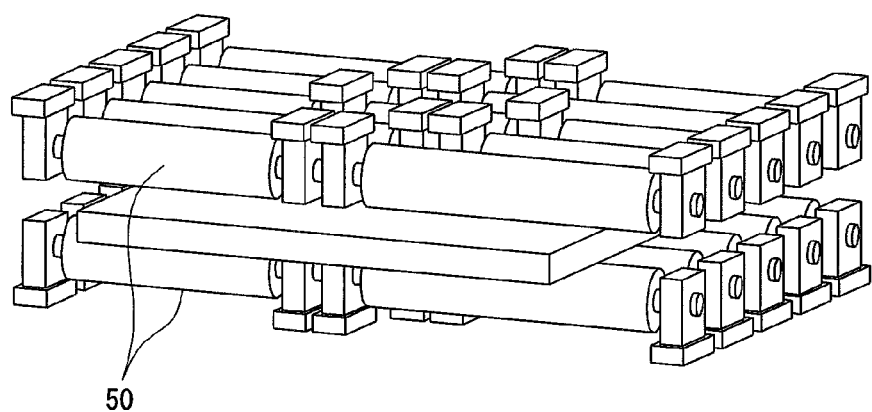
FIG. 6 is an outline view of a segment showing the portion A of FIG. 5 in an enlarged manner.
Figure 7:
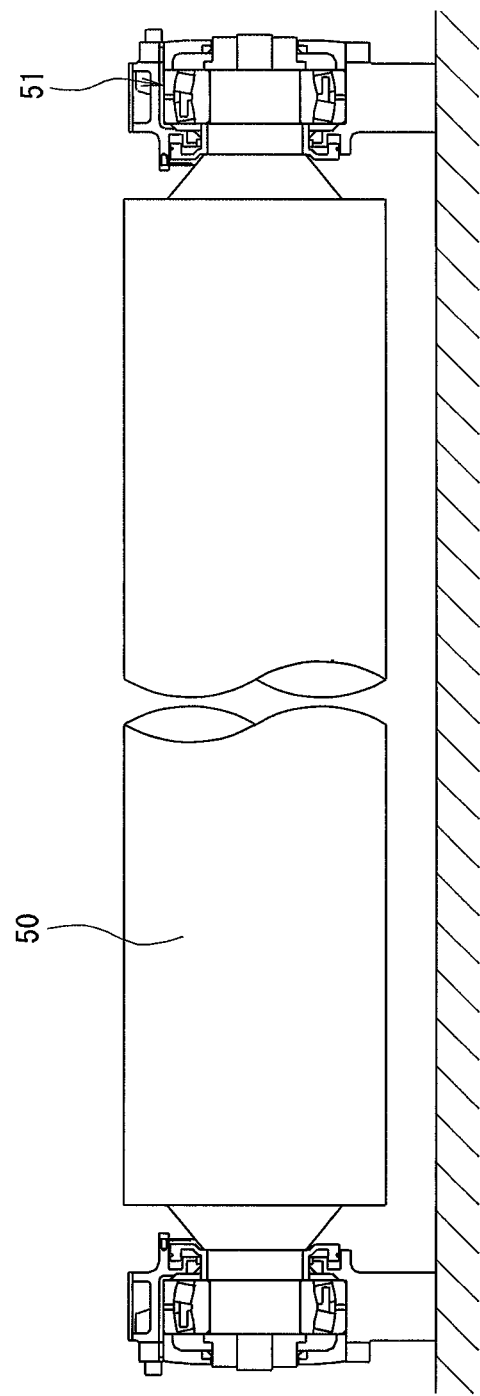
FIG. 7 is a partial sectional view of a guide roll.
Figure 8:
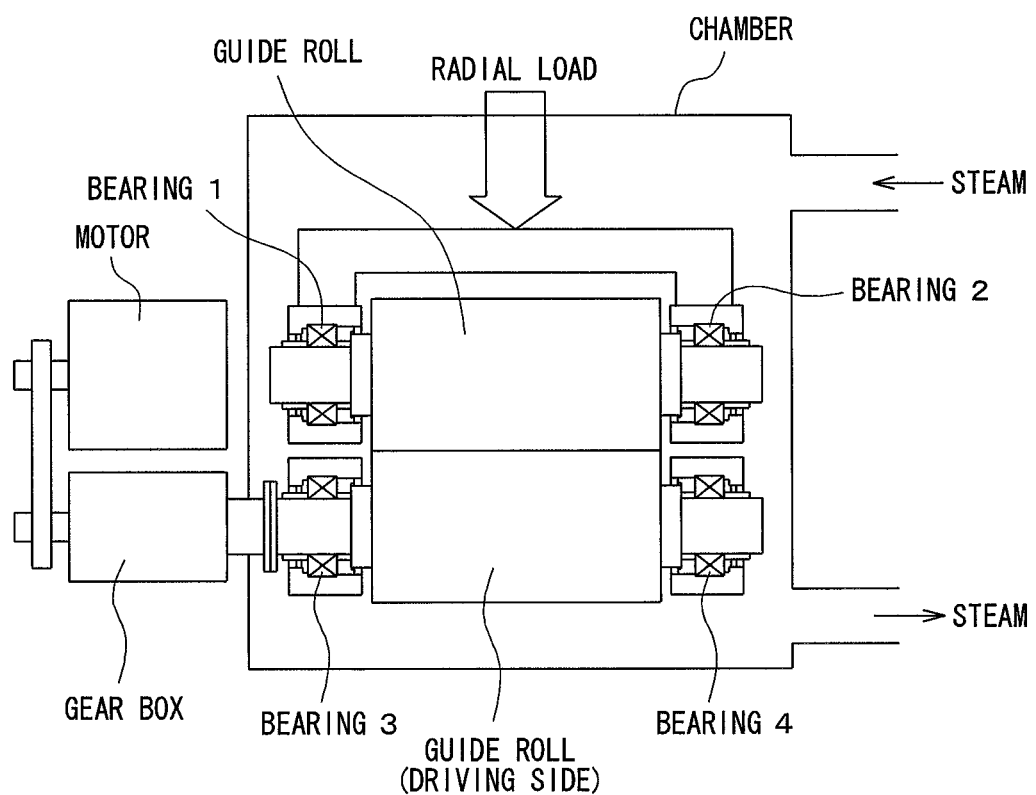
FIG. 8 is a conceptual diagram illustrating a structure of a testing machine of a bearing for guide roll.

Commercial grease is sealed in this bearing in 10g, and the bearing is incorporated at both end portions of a guide roll used in a continuous caster as shown in FIG. 5. And using a device as shown in FIG. 8, operation of driving for five days and stop for two days is continued for two months under the following condition and then, a rust development condition on the raceway surface of the outer ring and the like was visually observed.

TABLE 1

| | Outer ring | Inner ring | Roller | Cage | Evaluation of rust development |
|---|---|---|---|---|---|
| Experimental example 11 | Coated | Coated | Coated | Coated | AAAA |
| Experimental example 12 | Coated | Coated | No coating | No coating | BABA |
| Experimental example 13 | Coated | No coating | Coated | No coating | AAAB |
| Experimental example 14 | No coating | No coating | Coated | No coating | BBCB |
| Experimental example 15 | No coating | No coating | No coating | No coating | DCDD |
| Experimental example 16 | Coated | Coated | Coated | Coated | BBCC |

Test bearing: Self-aligning roller bearing with bearing designation 22210 (inner diameter: 50 mm, outer diameter: 90 mm, width: 23 mm, basic dynamic load rating: 99 kN, basic static load rating: 119 kN)

Rotation speed: 6 rpm

Radial load: 30 kN

Ambient environment: steam atmosphere at 90° C.

An observation result of rust development condition is ranked as follows. If there is no rust development at all, it is A rank, if some rust development is observed, it is B rank, if slightly strong rust development is partially confirmed, it is C rank, and if strong rust development is confirmed in a wide portion (particularly when strong rust development is confirmed on a pitch of the roller), it is D rank.

The result is shown in Table 1. In this test, two guide rolls are used to evaluate four pieces of test bearings (bearings 1 to 4 in FIG. 8), and Table 1 shows the evaluation result of the four pieces of the test bearings. In the evaluation result consisting of these four characters, the leftmost character shows the evaluation result of the bearing 1 in FIG. 8 and the evaluation results of bearings 2, 3, 4 in FIG. 8 are sequentially shown toward the right. For example, if the evaluation result of the bearing 1 is A rank, the bearing 2 is B rank, the bearing 3 is C rank, and the bearing 4 is D rank, it is indicated as "ABCD".

From the result of Table 1, it is known that metal coating on more members has a higher rust-proof effect. It was also confirmed that even with a member not coated with metal coating, certain rust-proof effect can be obtained only if a peripheral member is coated with the metal coating. Also, from the result of the experiment example 16 (the coating thickness of 4 to 6 μm) in which the metal coating constituted by zinc is formed by conventional electric zinc plating, it is known that the rust-proof effect of the experimental examples 11 to 14 in which the metal coating is formed by shot peening is more excellent.

[Rust-Proof Property Evaluation 2]

The rust-proof properties of a self-aligning roller bearing were evaluated similarly to the above-mentioned rust-proof property evaluation 1 except that the type of the metal coating is different. If zinc is left in the atmospheric air, it is worried that zinc reacts with oxygen and is oxidized and the rust-proof effect is lowered. Thus, in order to suppress oxidation of zinc, the bearing was coated with metal coating constituted by zinc and tin.

This metal coating is formed by shot peening of zinc coating with a thickness of 0.1 to 1 μm, first, and then by shot peening of a tin powder on the zinc coating. Conditions of the shot peening of zinc and tin are the same as in the case of the rust-proof property evaluation 1.

The thickness of the obtained metal coating was 0.5 to 2 μm. A circular portion with a diameter of 100 μm in the surface of the metal coating and a portion with a length of 100 μm in a section of the metal coating were visually observed by enlarging them by 200 times and confirmed by characteristic X-ray, and mixed presence of an alloy of zinc and tin and double-layer structure and complex structure were estimated.

TABLE 2

| | Outer ring | Inner ring | Roller | Cage | Evaluation of rust development two months | Evaluation of rust development four months |
|---|---|---|---|---|---|---|
| Experimental example 21 | Coated | No coating | Coated | No coating | AAAB | CBCD |
| Experimental example 22 | Coated | No coating | Coated | No coating | AABB | BBCC |

The result is shown in Table 2. The experimental example 21 uses metal coating of zinc coating similar to the rust-proof property evaluation 1, and the experimental example 22 uses the metal coating constituted by above-mentioned zinc and tin. The rust development conditions with the driving period of two months and four months were evaluated for each of them. The experimental example 21 shows a result with high rust-proof effect in the case of the driving period for two months, but in the case of the driving period for four months, slightly strong rust was developed. On the other hand, the experimental example 22 shows a result that the rust-proof effect continues for four months.

[Rust-Proof Property Evaluation 3]

A bearing with configuration substantially similar to that of the self-aligning roller bearing in FIG. 1 was prepared and incorporated in No. 12 segment of a slab continuous caster (actual machine). The test bearing is a self-aligning roller bearing with the bearing designation 24036 (inner diameter: 100 mm, outer diameter: 280 mm, width: 100 mm) and the bearing material is SUJ2 (HRc60 to 61). The basic dynamic load rating is 965 kN and the basic static load rating is 1750 kN.

The No. 12 segment is constituted by upper and lower six pieces of guide rolls, respectively, and the bearing is incorporated in the lower fixed-side guide rolls. This slab continuous caster was operated for approximately 7 months under a condition of a working rotating speed of 1 rpm. However, during the operating period for approximately 7 months, the operation is stopped once (two days) a month for repair of the facilities. After the operation for approximately 7 months, the bearing was removed from the guide roll and left at the site for approximately 1 month. If the bearing is left in such a way, season rust usually develops on the raceway surface of the outer ring, and the bearing is disassembled and the rust development condition on the raceway surface of the outer ring was visually observed. And the observation results of the rust development condition were ranked as A to D similarly to the above.

The test was conducted for two bearings in which the inner ring, outer ring, and the roller are coated with the metal coating (thickness is 0.5 to 2 μm) constituted by zinc and tin similarly to the above-mentioned rust-proof property evaluation 2 on the whole surfaces, and rust did not develop at all on either of them and they were ranked as A. Also, the test was conducted for two bearings in which the inner ring, outer ring, roller are coated with the metal coating (thickness is 0.1 to 1 μm) constituted by zinc on the whole surfaces, and slight rust development was found on one bearing due to a relation with reaction speed of zinc (one is ranked as A and the other as B).

On the other hand, on both the bearings not provided with the metal coating, rust development was found (both ranked as D), and even separation starting from the rust was found on one of them.

[Rust-Proof Property Evaluation 4]

A test bearing is incorporated in a hot run table of a hot finishing rolling machine (actual machine) and operated, and rust development and surface damage conditions were studied. This hot run table comprises several hundreds of guide rolls continuously arranged on a table and is installed after the final stand of the rolling machine.

As the test bearing, a self-aligning roller bearing with the bearing designation 23022 (inner diameter: 110 mm, outer diameter: 180 mm, width: 69 mm) and a cylindrical roller bearing with aligning housing ring with the bearing designation 110RUB41 are prepared, the self-aligning roller bearing is incorporated in the fixed-side guide roll of the guide rolls in the hot run table, while the cylindrical roller bearing with aligning housing ring is incorporated in the free-side guide roll. The basic dynamic load rating of the self-aligning roller bearing is 293 kN and the basic static load rating of the self-aligning roller bearing is 465 kN, while the basic dynamic load rating of the cylindrical roller bearing is 271 kN and the basic static load bearing of the cylindrical roller bearing is 490 kN.

The rolling machine incorporating the test bearing was operated and the guide roll is rotated at a rotating speed of several hundreds rpm. This rolling machine is operated under a condition in which an oil film is formed at the bearing relatively easily as compared with the continuous caster, but since maintenance is not usually carried out for more than one year, water might intrude due to seal deterioration of an axle box as a period of use gets longer, and surface damage (abrasion, smearing, peeling) might occur due to defective lubrication other than rust. The rolling machine was operated for six months and left for approximately two weeks and then, the test bearing was disassembled and the rust development condition and the surface damage condition on the raceway surface of the outer ring were visually observed.

TABLE 3

| | Abrasion | | Smearing | | Peeling | | Rust | |
|---|---|---|---|---|---|---|---|---|
| | fixed-side | free-side | fixed-side | free-side | fixed-side | free-side | fixed-side | free-side |
| Experimental example 31 | o■ | oo | oo | xo | xo | oo | ■x | x■ |
| Experimental example 32 | oo | oo | oo | oo | oo | oo | Δo | oΔ |
| Experimental example 33 | oo | oo | oo | oo | oo | oo | Δo | oo |

The result is shown in Table 3. In Table 3, a circle mark ("o") is given if there is no rust or surface damage (abrasion, smearing, peeling) at all, a triangle mark ("Δ") for a slight degree, a square mark ("■") for a somewhat remarkable degree, and a cross mark ("×") for a remarkable degree.

The test was conducted for the self-aligning roller bearing and the cylindrical roller bearing with aligning housing ring (two each for the both bearings) in which the metal coating (thickness is 0.5 to 2 μm) constituted by zinc and tin similarly to the above-mentioned rust-proof property evaluation 2 is applied on the whole surfaces of the inner ring, outer ring, roller, and little rust or surface damage was found. On the self-aligning roller bearing and the cylindrical roller bearing with aligning housing ring in which the metal coating (thickness is 0.1 to 1 μm) constituted by zinc on the whole surfaces of the inner ring, outer ring, and roller, and little rust or surface damage was found, either.

On the other hand, on the self-aligning roller bearing and the cylindrical roller bearing with aligning housing ring not provided with the metal coating (experimental example 31), surface damage was confirmed on one of the two, respectively. Also, rust development was found on all the bearings though the degree was different.

As mentioned above, since the metal coating has self-sacrificing rust-proof action and lubrication action, rust development as well as surface damage are suppressed even under the environment where water can intrude and contributes to longer life of the bearings.

[Rust-Proof Property Evaluation 5]

A test bearing is incorporated in a roll neck part of a testing machine imitating an actual rolling machine and operated so as to study development conditions of rust and surface damage. As the test bearing, a four-row tapered roller bearing with the bearing designation 343KVE4557 having a seal (See FIG. 11) was used. The inner diameter of the test bearing is 343 mm, the outer diameter is 457 mm, and the width is 254 mm.

Figure 9:
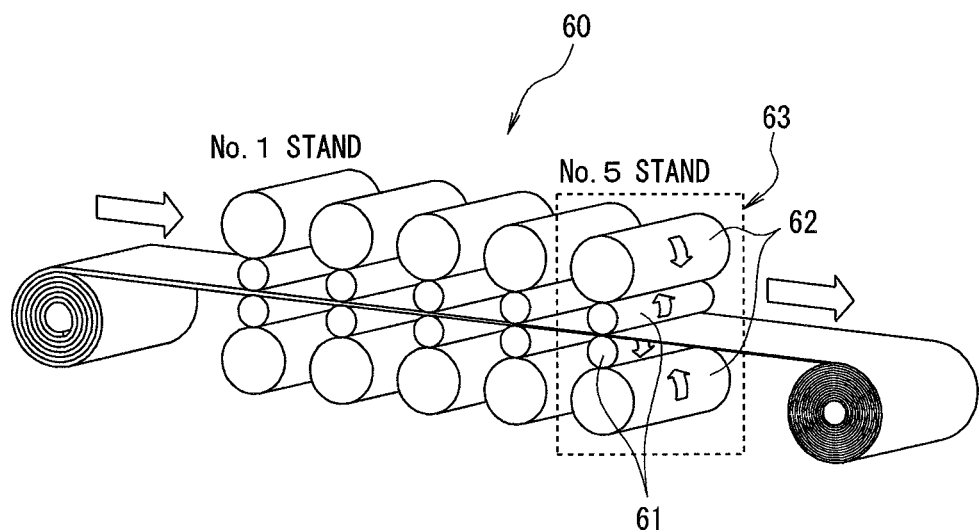
FIG. 9 is a view for explaining a structure of cold tandem finishing four-stage rolling mill.
Figure 10:
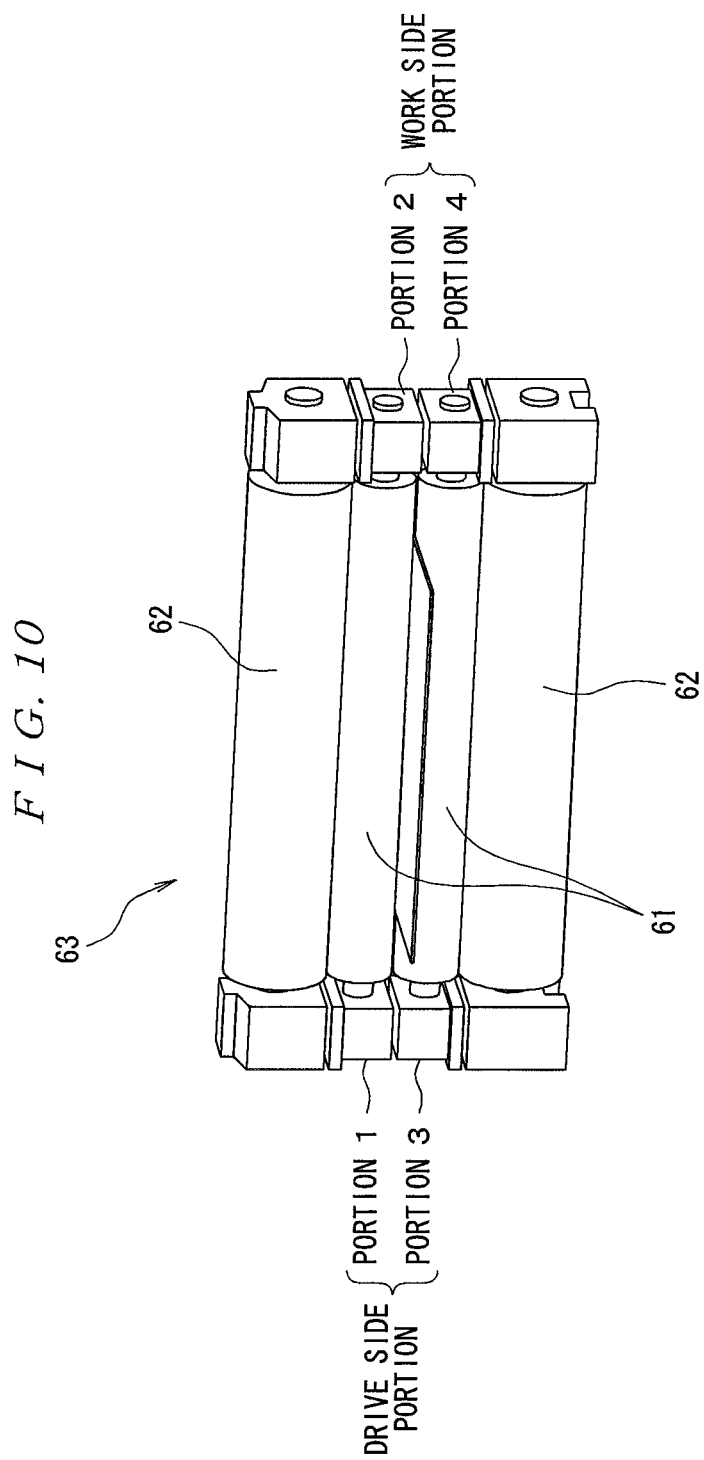
FIG. 10 is a view for explaining a structure of a stand.
Figure 12:
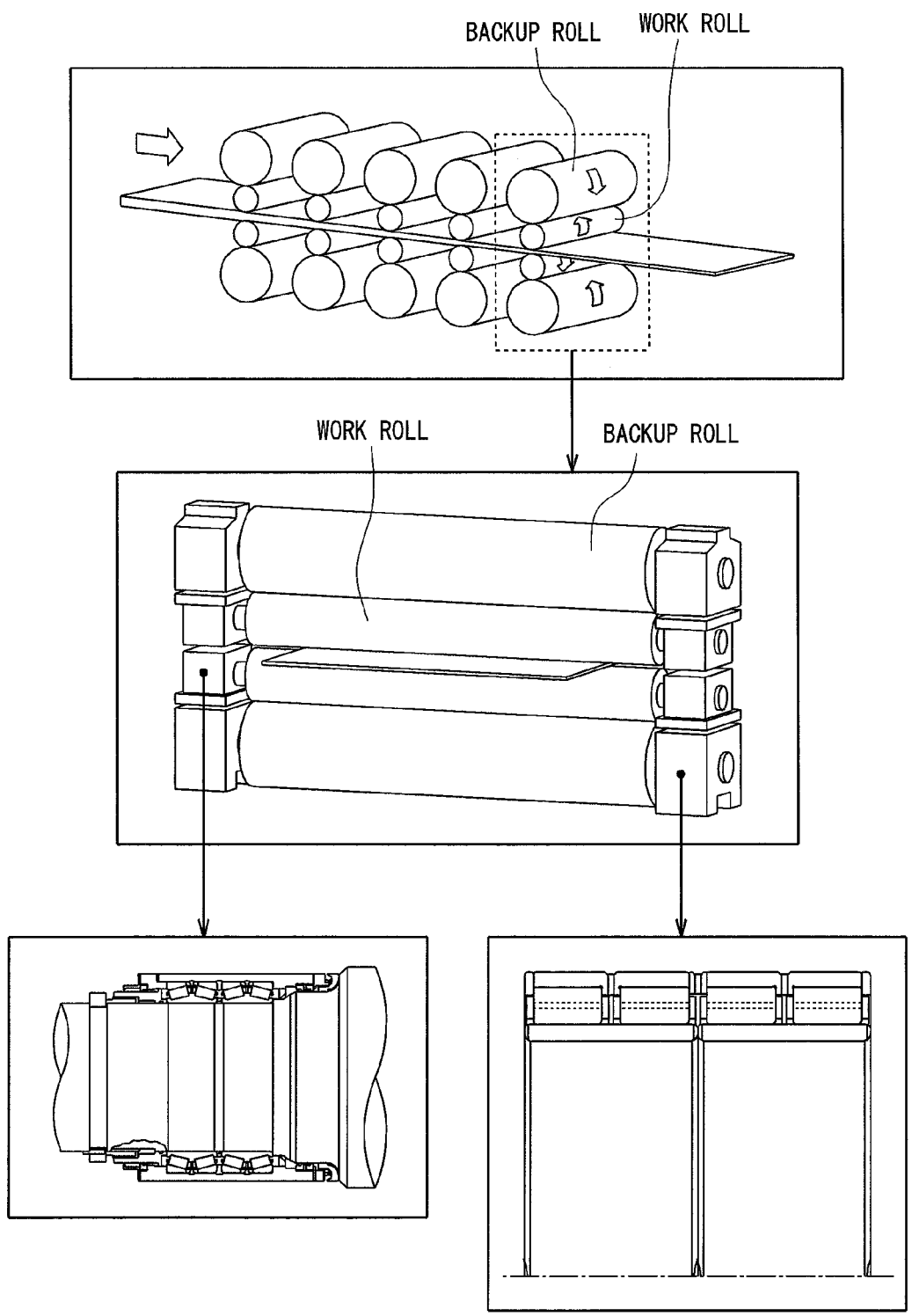
FIG. 12 is an explanatory view of a hot rolling mill.
Figure 13:
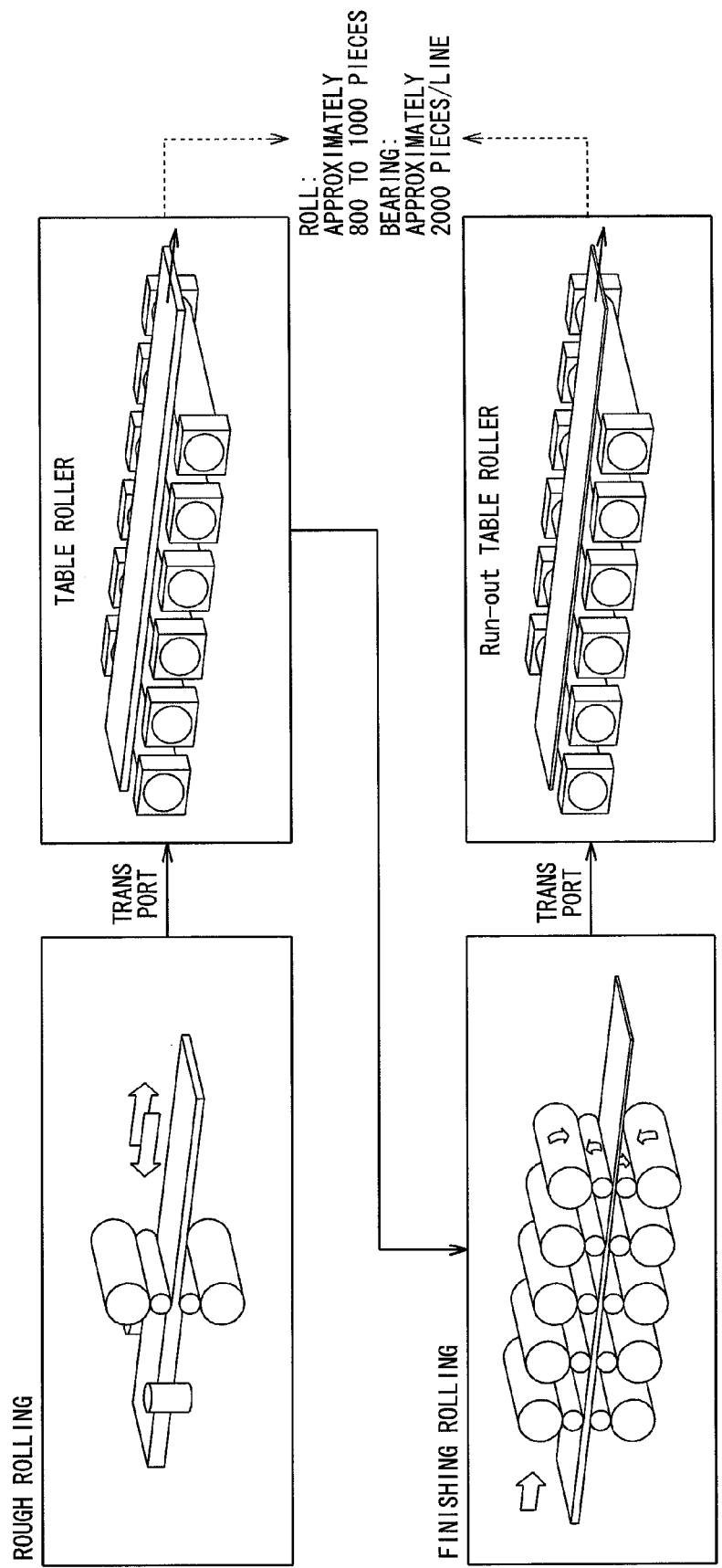
FIG. 13 is an explanatory view of a hot rolling facility (table roller)

This testing machine imitates a cold tandem finishing four-stage rolling machine 60 as shown in FIG. 9 and has five stands 63 (See FIG. 10) including two work rolls 61 and two backup rolls 62 arranged side by side. In the five stands, the test bearing was incorporated in the roll neck part of the two work rolls of No. 5 stand (final stand). In more detail, the bearings are incorporated at four locations in total: upper and lower parts of the work-side portion (portion 2 and portion 4) and upper and lower parts of the drive-side portion (portion 1 and portion 3) (See FIG. 10). At the No. 5 stand (final stand), rolling has progressed and there is little change in a thickness of a steel plate as compared with other stands, and its load is light and speed is fast usually. Thus, a probability of occurrence of smearing at the bearing is higher than the other stands.

The testing machine in which the test bearing is incorporated was operated with the conditions as follows. An operation of a cycle in which after the machine is operated for one hour at the rotating speed of 100 rpm, it is operated for two hours at 1000 rpm and further operated for 1 hour at 100 rpm and then, it is stopped for 20 hours (0 rpm) was repeated for six months. During that period, no maintenance was carried out for the bearing. The load applied on the test bearing is P/C=0.2 (P: dynamic equivalent load, C: basic dynamic load rating).

Moreover, rolling water was poured into the test bearing during the test. The rolling water was poured three times per operation of the above 1 cycle for 24 hours. In more detail, 2 ml of rolling water was poured before speed increase to 1000 rpm after 1-hour operation at the rotating speed of 100 rpm, after 1-hour operation at 1000 rpm and before deceleration to 100 rpm after 2-hour operation at 1000 rpm, respectively. The highest temperature of the outer diameter part of the outer ring during the test was approximately 80° C.

Here, the coating provided at the test bearing will be explained. The test bearing incorporated in the above-mentioned portion 1 is coated with the metal coating (thickness of 0.1 to 1 μm) constituted by zinc on the whole surfaces of all the outer rings and rollers of the multi row, while the whole surfaces of all the inner rings are coated with manganese phosphate coating. The test bearing incorporated in the portion 2 is coated with the metal coating (thickness of 0.5 to 2 μm) constituted by zinc and tin on the whole surfaces of all the outer rings and rollers obtained by shot blast of tin after applying the zinc coating by shot blast in advance, and the whole surfaces of all the inner rings are coated with the manganese phosphate coating. Moreover, the test bearings incorporated in the portion 3 and the portion 4 are coated with the manganese phosphate coating on the whole surfaces of all the inner rings and outer rings. The forming method and its conditions of the metal coating are the same as those of the rust-proof property evaluations 1, 2.

The testing machine was operated for six months as above, and the testing bearing was disassembled and the rust development condition and the occurrence condition of the surface damage on the raceway surface of the outer ring were visually observed. The results are shown in Table 4. In Table 4, a circle mark ("o") is given if there is no rust or surface damage (abrasion, smearing, peeling) at all, a triangle mark ("Δ") for a slight degree, a square mark ("■") for a somewhat remarkable degree, and a cross mark ("×") for a remarkable degree.

TABLE 4

| | Abrasion | Smearing | Peeling | Rust |
|---|---|---|---|---|
| Portion 1 | o | o | o | o |
| Portion 2 | o | o | o | o |
| Portion 3 | o | Δ | o | ■ |
| Portion 4 | o | Δ | o | x |

On the test bearing incorporated in the portion 3 and the portion 4 coated with the manganese phosphate coating, surface damage was occasionally found and rusts were somewhat remarkable. Since those with surface damage also have rusts developed, it is estimated that suppression on the surface damage became difficult since lubrication state got severe due to water intrusion.

On the other hand, the test bearing incorporated in the portion 1 coated with the metal coating constituted by zinc and the test bearing incorporated in the portion 2 coated with the metal coating constituted by zinc and tin did not have any surface damage or rust.

Next, a portion where the test bearing is incorporated was changed and the same test was conducted. That is, the test bearings incorporated in the above-mentioned portion 1 and the portion 2 are coated with the manganese phosphate coating on the whole surfaces of all the inner rings and outer rings of the multi row. Also, the test bearing incorporated in the portion 3 is coated with the metal coating (thickness of 0.1 to 1 μm) constituted by zinc on the whole surfaces of all the outer rings and rollers and coated with the manganese phosphate coating on the whole surfaces of all the inner rings. The test bearing incorporated in the portion 4 is coated with the metal coating (thickness of 0.5 to 2 μm) constituted by zinc and tin on the whole surfaces of all the outer rings and rollers and coated with the manganese phosphate coating on the whole surfaces of all the inner rings. The result is shown in Table 5.

TABLE 5

|  | Abrasion | Smearing | Peeling | Rust |
|---|---|---|---|---|
| Portion 1 | ○ | Δ | Δ | x |
| Portion 2 | ○ | ○ | ○ | Δ |
| Portion 3 | ○ | ○ | ○ | Δ |
| Portion 4 | ○ | ○ | ○ | ○ |

On the test bearings incorporated in the portion 1 and the portion 2 coated with the manganese phosphate coating, surface damage was occasionally found and rusts were somewhat remarkable similarly to the result of the above-mentioned Table 4.

On the other hand, on the test bearing incorporated in the portion 3 coated with the metal coating constituted by zinc, though there was no surface damage, slight rust was found. The test bearing incorporated in the portion 4 coated with the metal coating constituted by zinc and tin had no surface damage or rust similarly to the result of the above-mentioned Table 4.

Summarizing the results of Tables 4, 5, it can be concluded that the metal coating constituted by zinc or metal coating constituted by zinc and tin have more excellent effect to suppress surface damage and rust than the manganese phosphate coating, which is a prior art. Also, the metal coating constituted by zinc and tin has more excellent rust-proof effect than the metal coating constituted by zinc.

Second Embodiment

Rolling bearings might be used under an environment in which water can easily intrude into the bearing. For example, agricultural machines such as tractors, rice planter, paper manufacturing machines, and construction machines might be soaked in water during work, and water might intrude into the bearing used in those machines, which might cause rusts inside the bearings.

Also, multi-purpose four-wheel buggies might run on a rough road with puddles or cross a river in some cases, and many mechanical seals are attached so as to prevent water intrusion into the main body of the multi-purpose four-wheel buggy. However, water might intrude into the bearing used in the multi-purpose four-wheel buggy even if the mechanical seals are attached, which might cause rusts inside the bearing. In such use environment, the bearing life is controlled not by rolling fatigue life due to internal separation but by rust development including damage such as separation starting from the rust in some cases.

As means for suppressing rust development, there have been used means of attaching a mechanical seal around the bearing in order to prevent intrusion of water, means of using stainless steel for a bearing material and the like.

Other than the above problem of rusts, there are also the following problems. That is, if water and the like intrude into the bearing during use, the lubrication state is deteriorated, the rolling element slips on the raceway surface, and a phenomenon called smearing which damages the raceway surface and the surface of the rolling element can easily occur.

As a solution to these problems, improvement of a material resistant to abrasion is proposed as described in Patent Document 5.

However, in the case of the bearings used in the agricultural machines, paper manufacturing machines, construction machines, multi-purpose four-wheel buggies, even if the mechanical seal is attached in order to prevent water intrusion, the water intrusion cannot be prevented completely, and it is required that rust will not develop even if water intrudes.

Since a rolling bearing having the same configuration as that of the first embodiment (deep-groove ball bearing, angular contact ball bearing, cylindrical roller bearing, tapered roller bearing, needle roller bearing) is provided with the above-mentioned metal coating, even if water intrudes into the bearing when used in the agricultural machine, paper manufacturing machine, construction machine, multi-purpose four-wheel buggy, rust development or damage on the raceway surface, rolling surface is hard to occur. Also, improvement of abrasion prevention performance under the condition where water can easily intrude, that is, lubrication performance is more remarkably found in the bearing for the above usages rather than general usages.

In the rolling bearings used in the agricultural machine, paper manufacturing machine, construction machine, multi-purpose four-wheel buggy, preferable values of surface roughness, coverage and the like of the metal coating are the same as those in the first embodiment, and the description will be omitted.

Figure 14:
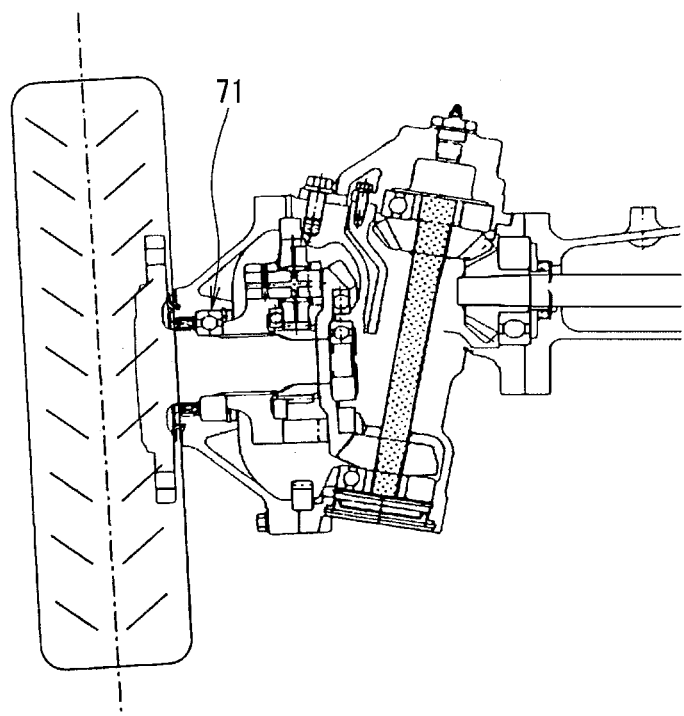
FIG. 14 is a view illustrating a structure of an underbody of a tractor.
Figure 15:
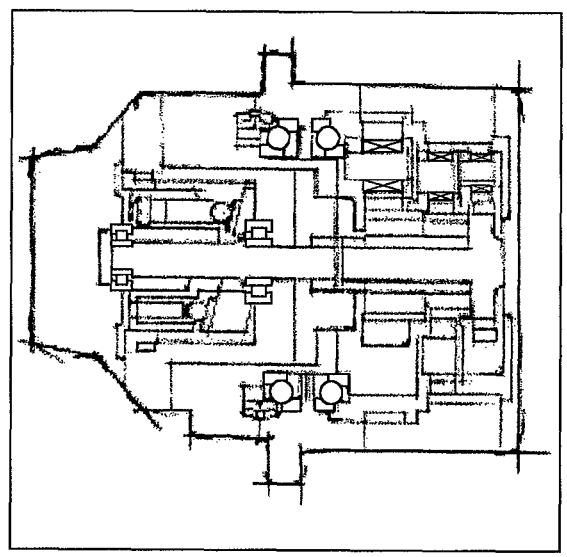
FIG. 15 is a view illustrating a structure of a traveling reduction gear of a hydraulic shovel.
Figure 16:
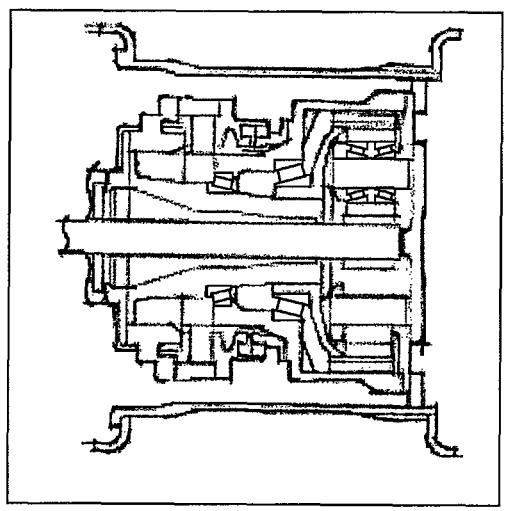
FIG. 16 is a view illustrating a structure of a front axle of a wheel loader.
Figure 17:
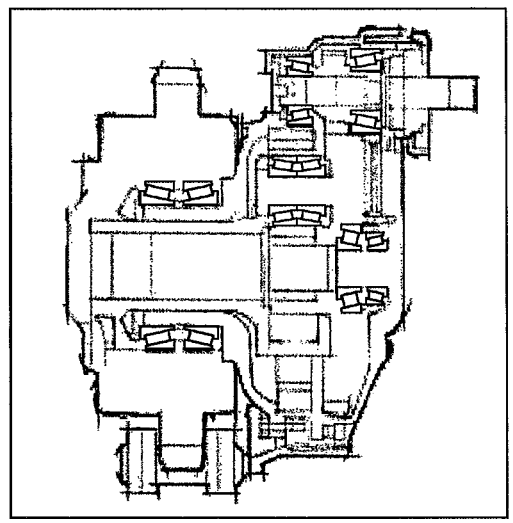
FIG. 17 is a view illustrating a structure of a traveling reduction gear of a bulldozer.
Figure 18:
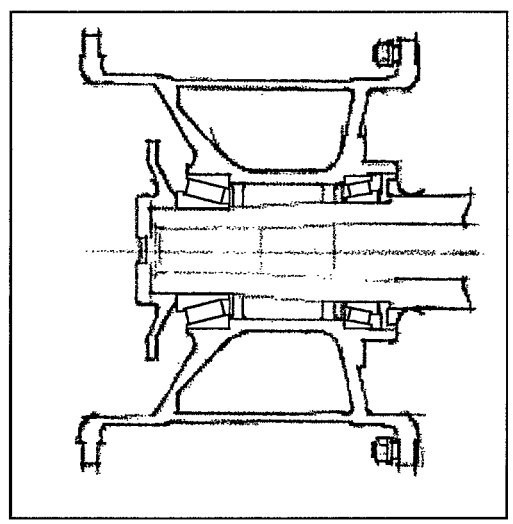
FIG. 18 is a view illustrating a structure of a wheel of a dump truck.

As an example of the agricultural machine, a tractor as shown in FIG. 14 can be cited. A rolling bearing 71 is incorporated in an underbody of the tractor and used for rotation supporting mechanism and the like of a wheel. As an example of the construction machine, hydraulic shovel, wheel loader, bulldozer, dump truck can be cited. In the hydraulic shovel, cylindrical roller bearing, angular contact ball bearing, needle roller bearing are mainly used and incorporated in the rotation supporting mechanism and the like of the underbody (traveling speed reduction gear) (See FIG. 15). In the wheel loader, tapered roller bearing is mainly used and incorporated in the rotation supporting mechanism and the like of the underbody (front axle) (See FIG. 16). In the bulldozer, tapered roller bearing is mainly used and incorporated in the rotation supporting mechanism and the like of the underbody (traveling speed reduction gear) (See FIG. 17). In the damp truck, tapered roller bearing is mainly used and incorporated in the rotation supporting mechanism and the like of the underbody (wheel) (See FIG. 18).

Third Embodiment

The rolling bearing might be used in an environment where water can easily intrude into the bearing. For example, oil is generally used for lubrication of a rotor of a screw compressor, but since a harmful influence can be exerted to the environment if oil is mixed in compressed air, a water-lubrication compressor is used in which lubrication is carried out by water instead of oil as an environmental measure. A mechanical seal is attached to a compressor bearing supporting a shaft of the water-lubrication compressor to prevent water intrusion, but water might intrude into the bearing due to damage on the mechanical seal, and rust can easily occur inside the bearing.

Since the self-aligning roller bearing supporting an unbalance weight roll of a vibration sieve, which is a mine facility, is stored and transported for a long time from when the bearing is incorporated in a machine till installed at a mine site, rust might develop during that period. Also, if its operation is stopped for several hours for regular inspection and the like, rust can easily develop inside the bearing (so-called season rust) during the stop period.

Moreover, in a pump handling water in many cases, a mechanical seal is attached to a bearing for pump supporting a main shaft in order to prevent water intrusion, but water might intrude into the bearing due to damage on the mechanical seal and rust can easily occur inside the bearing.

In such use environment, the bearing life is controlled not by rolling fatigue life due to internal separation but by rust development including damage such as separation starting from the rust in some cases.

As means to suppress development of the above rust, means of attaching a mechanical seal around the bearing in order to prevent water intrusion, means of applying chemical conversion treatment such as phosphate coating on the whole surface of the bearing, means of forming metal coating made of zinc and the like by electric plating and the like have been employed.

Other than the above problem of rusts, there are also the following problems. That is, if water and the like intrude into the bearing during use, the lubrication state is deteriorated, the rolling element slips on the raceway surface, and a phenomenon called smearing which damages the raceway surface and the surface of the rolling element can easily occur.

Also, the self-aligning roller bearings are often used in the vibration sieve but as a characteristic of the self-aligning roller bearing, differential slip between the raceway surface and the rolling surface of the rolling element is unavoidable. If water, foreign substances and the like intrude into the self-aligning roller bearing, the surface damage caused by differential slip is accelerated.

As a solution to these problems, improvement of a material resistant to abrasion and the like is proposed as described in Patent Document 5.

However, in the case of the bearing used in the above applications, even if a mechanical seal is attached in order to prevent water intrusion, water intrusion cannot be prevented completely, and no rust development even in the case of water intrusion is in demand.

Since the rolling bearings having the same configuration as in the first embodiment (deep-groove ball bearing, angular contact ball bearing, cylindrical roller bearing, tapered roller bearing, four-point contact ball bearing) are provided with the above-mentioned metal coating, even if water and the like intrude into the bearing when used as a bearing supporting a main shaft of a water-lubrication compressor, rust development or damage on raceway surfaces and rolling surfaces are hard to occur. Also, improvement of abrasion prevention performance under the condition where water can easily intrude, that is, lubrication performance is more remarkably found in the bearing for the above usages rather than general usages.

Moreover, since the rolling bearings having the same configuration as in the first embodiment (self-aligning roller bearing, cylindrical roller bearing, tapered roller bearing, ball bearing) are provided with the above-mentioned metal coating, even if they are used for bearings supporting main shafts of shaking sieve, pulverizer, and crusher, which are mine facilities and bearings supporting rollers of conveying devices (conveyer) and water and the like intrude into the bearing, rust development or damage on the raceway surface, rolling surface are hard to occur. Also, improvement of abrasion prevention performance under the condition where water can easily intrude, that is, lubrication performance is more remarkably found in the bearing for the above usages rather than general usages.

Moreover, since the rolling bearings having the same configuration as in the first embodiment (deep-groove ball bearing, angular contact ball bearing, cylindrical roller bearing) are provided with the above-mentioned metal coating, even if they are used for bearings supporting main shafts of a pump and water and the like intrude into the bearing, rust development or damage on the raceway surface, rolling surface are hard to occur. Also, improvement of abrasion prevention performance under the condition where water can easily intrude, that is, lubrication performance is more remarkably found in the bearing for the above usages rather than general usages.

In the case of the rolling bearings used in the water-lubrication compressor, mine facilities, pumps, preferable values of the surface roughness, coverage and the like of the metal coating are similar to those in the first embodiment, and the description will be omitted.

Figure 19:
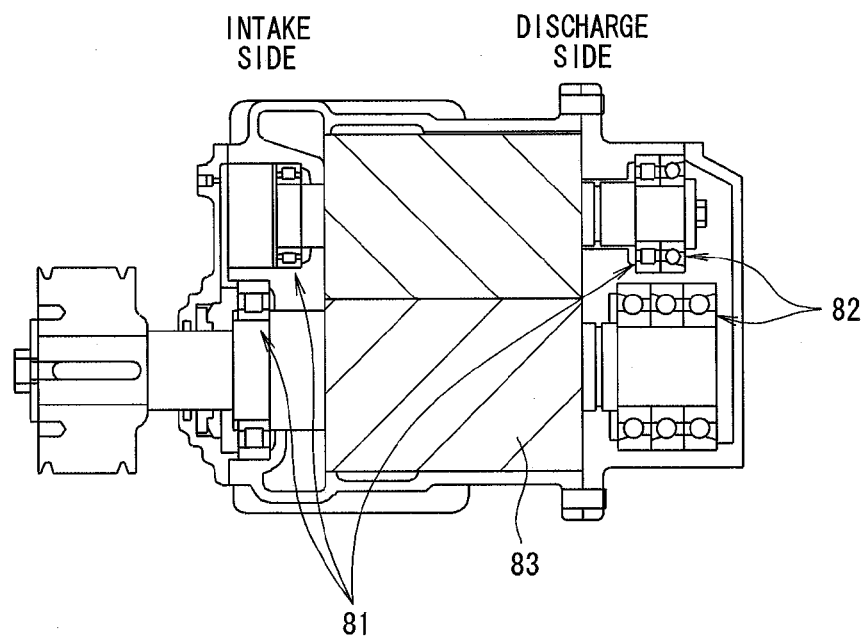
FIG. 19 is a view illustrating a structure of a rotor of a screw compressor.
Figure 20:
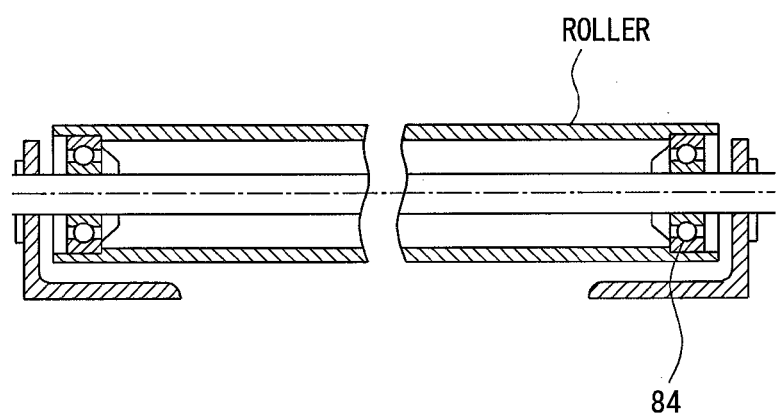
FIG. 20 is a view illustrating a structure of a part of a conveyer.
Figure 21:
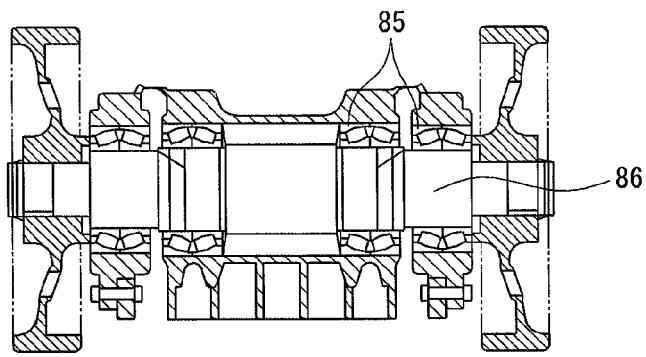
FIG. 21 is a view illustrating a structure of a main shaft peripheral part of a pulverizer.
Figure 22:
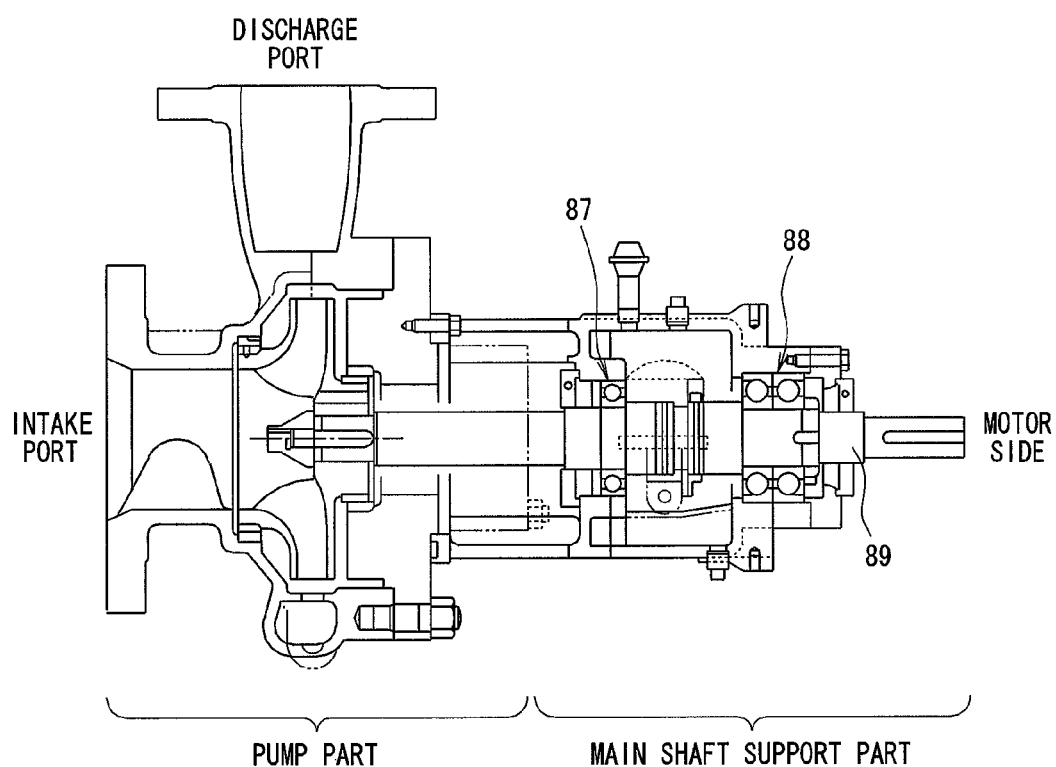
FIG. 22 is a view illustrating a structure of a centrifugal pump.

As an example of the water-lubrication compressor, a screw compressor as shown in FIG. 19 can be cited. Rolling bearings such as a cylindrical roller bearing 81, an angular contact ball bearing 82 and the like are used in a rotation supporting mechanism of a main shaft 83. As an example of the mine facilities, a conveyer as shown in FIG. 20 and a pulverizer as shown in FIG. 21 can be cited. Rolling bearings such as a deep-groove ball bearing 84, self-aligning roller bearing 85 and the like are used in the rotation supporting mechanism of a shaft 86. Moreover, as an example of the pump, a centrifugal pump as shown in FIG. 22 can be cited. The rolling bearings such as a deep-groove ball bearing 87, an angular contact ball bearing 88 and the like are used in the rotation supporting mechanism of a main shaft 89.

Fourth Embodiment

This embodiment relates to a rolling device such as rolling bearing, linear guide device, ball screw, linear bearing and the like and particularly to a rolling device in which rust can hardly develop inside.

For example, a rolling bearing used in office equipment such as a copying machine is used under an environment with high temperature and high humidity for fixation of toner and the like, and under such use environment, corrosion resistance is required. Such corrosion resistance of the rolling bearing has been ensured by applying rust preventive oil on the surface. As the rust preventive oil, because of its action to prevent rust development, synthetic hydrocarbon oil, mineral oil and the like are used, and application of such rust preventive oil is a generally-used rust-proof technique in the conventional rolling bearings made by bearing steel.

On the other hand, in the office equipment incorporating rolling bearings, use of a polymer material to a bearing support part supporting the rolling bearing with the purpose of reduction of weight and costs of the constituent members has been increased. For example, the bearing support parts such as photosensitive drum, fixing roll and the like, particularly a housing with an outer ring fixed are constituted by the polymer material in the increasing number of cases. The polymer materials in use include polystyrene (PS) and high-impact polystyrene (HIPS) obtained by copolymerization of styrene and ethylene for improvement of toughness. Also, polyoxymethylene (POM) and polycarbonate (PC) resistant to the external environment are often used.

However, the rust preventive oil has an action to deteriorate strength of the polymer material, which leads to destruction due to a continuously applied stress (hereinafter referred to as chemical attack in some cases). That is caused by intrusion of the rust preventive oil into a domain constituting the polymer, which deteriorates strength. As mentioned above, use of the rust preventive oil has been indispensable in order to impart corrosion resistance to the rolling bearings, but if the bearing support part of the office equipment is constituted by a polymer material, for example, the chemical attack by the rust preventive oil might lead to breakage.

As the rust-proof technique not using the rust preventive oil, there is a measure to change the material of the rolling bearing from the bearing steel to stainless steel, but though the stainless steel is excellent in corrosion resistance, workability is not sufficient, and there is a problem that working efficiency is lowered and manufacturing costs are increased. Also, there is means of forming coating by chemical conversion treatment (plating processing) on the surface of the rolling bearing, but since the surface needs to be pickled as pre-treatment, there is a fear of embrittlement of the steel due to hydrogen generated in the process of pickling.

Then, the present invention has an object to solve the above problems of the prior art and to provide a rolling device in which there is no fear of hydrogen embrittlement of the steel or chemical attack to the polymer material but which is inexpensive and hard to develop rust.

In order to achieve the above object, the present invention is configured as follows. That is, in the rolling device according to the present invention comprising an inner member having a raceway surface on an outer face, an outer member having a raceway surface opposing the raceway surface of the inner member and arranged outside of the inner member, and a plurality of rolling elements arranged rotatably between the both raceway surfaces, at least any one of the inner member, the outer member, and the rolling elements is provided with metal coating made of zinc and tin at least on a part of its surface, and the metal coating is formed by shot blast of a tin powder after shot blast of a zinc powder.

Moreover, in the rolling device according to the present invention comprising an inner member having a raceway surface on an outer face, an outer member having a raceway surface opposing the raceway surface of the inner member and arranged outside of the inner member, and a plurality of rolling elements arranged rotatably between the both raceway surfaces, at least any one of the inner member, the outer member, and the rolling elements is provided with metal coating made of zinc and tin at least on a part of its surface, and the metal coating is formed by shot blast of a mixed powder of a tin powder and a zinc powder.

Moreover, in the rolling device according to the present invention comprising an inner member having a raceway surface on an outer face, an outer member having a raceway surface opposing the raceway surface of the inner member and arranged outside of the inner member, and a plurality of rolling elements arranged rotatably between the both raceway surfaces, at least any one of the inner member, the outer member, and the rolling elements is provided with metal coating made of zinc and tin at least on a part of its surface, and the metal coating is formed by shot blast of a powder of an alloy of zinc and tin.

In the rolling device provided with such metal coating formed by shot blast, the content of zinc contained in the metal coating is preferably 5 mass % or more and 80 mass % or less and the content of tin is preferably 95 mass % or less and 20 mass % or more.

Also, in these rolling devices, the constituent member provided with the metal coating in the inner member, the outer member, and the rolling elements is constituted by steel, and hydrogen concentration in the steel is preferably 0.5 ppm or less.

If the surface is coated with the metal coating containing zinc, which is a metal less noble than iron as a main component of the steel constituting the inner member, outer member, rolling elements, zinc, less noble than iron, dissolves away with priority even under the environment where rust can easily develop, and dissolving-away of iron to become rust can be suppressed. Also, since the metal coating contains tin, which is nobler than iron and hard to rust, the base (base material) is protected by the metal coating and rust development is suppressed.

Moreover, since the metal coating is formed by shot blast, the rolling device of the present invention is inexpensive. Moreover, since rust-proof treatment is applied without using the rust preventive oil, there is no fear of chemical attack affecting the member made of a polymer material arranged around the rolling device. Moreover, since the rust-proof treatment is applied without using the chemical conversion treatment (plating processing), hydrogen concentration in the steel constituting the constituting member (inner member, outer member, rolling element) (hydrogen concentration after the metal coating is formed by shot blast) is at such a degree that hydrogen embrittlement does not occur (0.5 ppm or less). In the case of the rust-proof treatment by the conventional electric plating method, dehydrogenation is required by applying baking as post-treatment in order to suppress hydrogen embrittlement, but the rolling device of the present invention does not need such post-treatment.

The metal coating formed by shot blast of the tin powder after shot blast of the zinc powder is considered to have a double-layer structure, alloy structure, complex structure or a structure in which two or more of the structures are mixed as follows. That is, the double-layer structure is a structure of the metal coating made of two layers of a zinc layer on the inner side and a tin layer on the surface side. The alloy structure is a structure that substantially the whole of the metal coating is made of an alloy of zinc and tin. Moreover, the complex structure is a structure that substantially the whole of the metal coating is made of a mixture of zinc and tin and a proportion of zinc is gradually decreased from the inside (base material side) to the surface side, while the proportion of tin is gradually increased. As an example of the structure in which two or more of these structures are mixed, a three-layer structure made of a zinc layer on the inner side (base material side), an intermediate alloy layer, and a tin layer on the surface side can be cited.

Also, the metal coating formed by shot blast of a mixed powder of a zinc powder and a tin powder and the metal coating formed by shot blast of a powder of an alloy of zinc and tin have the above alloy structure.

As mentioned above, the rolling device according to the present invention is inexpensive and hard to develop rust. Also, there is no fear that the member made of a polymer material arranged around the rolling device is affected by chemical attack. Moreover, there is no fear of occurrence of hydrogen embrittlement of steel.

Figure 23:
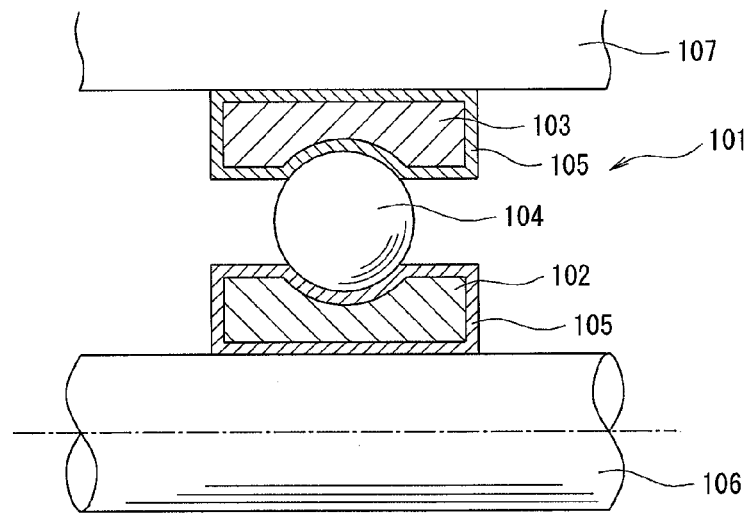
FIG. 23 is a longitudinal sectional view illustrating a structure of a deep-groove ball bearing, which is a fourth embodiment of the rolling device according to the present invention.

A fourth embodiment will be described below in detail referring to the attached drawings. FIG. 23 is a longitudinal sectional view illustrating a structure of a deep-groove ball bearing, which is an embodiment of the rolling device according to the present invention. This deep-groove ball bearing 101 is provided with an inner ring 102 (inner member), an outer ring 103 (outer member), and a plurality of rolling elements 104 arranged rotatably between the inner ring 102 and the outer ring 103. A shaft member 106 is fitted in an inner peripheral surface of the inner ring 102, and an outer peripheral surface of the outer ring 103 is fitted in a bearing support part 107 of a rotating drum, not shown. Thereby, the rotating drum is rotatably supported by the deep-groove ball bearing 101. A cage for holding the rolling elements 104 between the inner ring 102 and the outer ring 103, and sealing device such as a seal and the like may be provided.

At least one of the inner ring 102, outer ring 103, and rolling elements 104 is provided with metal coating 105 made of zinc and tin at least on a part of its surface. The metal coating 105 may be formed by shot blast of a tin powder after shot blast of a zinc powder, may be formed by shot blast of a mixed powder of the zinc powder and tin powder, or may be formed by shot blast of a powder of an alloy of zinc and tin.

In FIG. 23, the inner ring 102 and the outer ring 103 are provided with the metal coating 105, but the present invention is not limited to the example in FIG. 23, and the rolling element 104 may be provided with the metal coating. Also, in FIG. 23, the metal coating 105 is formed on the entire surfaces of the inner ring 102 and the outer ring 103, but the rust-proof effect can be obtained even if the metal coating is formed at a part of the surface.

In order to obtain the excellent rust-proof effect, it is preferable that the content of zinc contained in the metal coating 105 is 5 mass % or more and 80 mass % or less and the content of tin is 95 mass % or less and 20 mass % or more. If the metal coating 105 is formed by a method of shot blast of the tin powder after shot blast of the zinc powder, the contents of zinc and tin contained in the metal coating 105 can be controlled to desired amounts by a condition (projection pressure and the like) when the tin powder is shot-blasted. Also, if the metal coating 105 is formed by a method of shot blast of the mixed powder of the zinc powder and the tin powder, it can be controlled by an amount ratio between the zinc powder and the tin powder in the mixed powder. Moreover, if the metal coating 105 is formed by a method of shot blast of the powder of the alloy of zinc and tin, it can be controlled by an amount ratio between zinc and tin constituting the alloy.

The rolling device of the present invention may be provided with a cage, sealing device or any other accessory members but the cage, sealing device or any other accessory members may be provided with the above-mentioned metal coating 105. If the cage, sealing device or any other accessory members are made of steel, the same rust-proof effect as above can be expected. In the case of the cage, it has at least a portion sliding with the rolling element, and lubrication and rust-proof effects can be expected. In the case of the sealing device, it has at least a contact with an external environment, and rust-proof effect can be expected in a situation in contact with moisture. The same applies to a spacer and a separator.

Also, in this embodiment, the deep-groove ball bearing is explained as an example of the rolling device, but the type of the rolling bearing is not limited to the deep-groove ball bearing, but the present invention can be applied to various types of rolling bearings. For example, they include radial type rolling bearing such as angular contact ball bearing, self-aligning ball bearing, self-aligning roller bearing, needle roller bearing, cylindrical roller bearing, tapered roller bearing and the like and thrust type rolling bearing such as thrust ball bearing, thrust roller bearing and the like. Moreover, the present invention is not limited to rolling bearings but can be applied to various rolling devices of other kinds such as ball screw, linear guide device, linear bearing and the like.

Example

An example is shown below and the present invention will be described in more detail.

[Rust-Proof Property Evaluation]

A deep-groove ball bearing in which metal coating is formed on the entire surfaces of the inner ring and the outer ring (bearing with configuration substantially the same as the deep-groove ball bearing in FIG. 23) was prepared and its rust-proof property was evaluated. The deep-groove ball bearing has an outer diameter of 19 mm, inner diameter of 8 mm, and width of 6 mm.

The metal coating was formed by shot blast of the tin powder after shot blast of the zinc powder, and by changing a shot pressure or blasting time of the tin powder, bearings provided with metal coatings with different contents of zinc and tin were obtained (See Examples 101 to 110 in Table 6). A shot peening device was used for forming the metal coating, and the zinc powder and tin powder with an average grain size of 45 μm (according to the specification of JIS R 6001) was used as a shot media. The shot pressure is 0.196 to 0.882 MPa and the blasting time is 10 to 20 min. Masses of the inner ring and the outer ring used in single processing were 1 to 20 kg, respectively.

The comparative example 101 in Table 6 is a bearing to which the rust-proof treatment is not provided with the metal coating but applied by applying the conventional rust preventive oil. The comparative examples 102, 103 are bearings to which the rust-proof treatment is applied by forming a zinc coating or tin coating by the conventional electric plating method. The comparative example 104 is a bearing on which the tin coating is formed by shot blast of the tin powder with an average grain size of 45 μm (according to the specification of JIS R 6001). The conditions of shot blast such as the shot pressure, blasting time and the like are the same as those for the examples 101 to 110.

TABLE 6

|  |  | Contents in metal coating[1] | | Rust development | Hydrogen concentration | Rupture |
| --- | --- | --- | --- | --- | --- | --- |
|  |  | zinc | tin | time | in steel[2] | time |
| Example | 101 | 5 | 95 | 23 | 0.3 | 100 |
|  | 102 | 8 | 92 | 22 | 0.1 | 100 |
|  | 103 | 20 | 80 | 37 | 0.3 | 100 |
|  | 104 | 33 | 67 | 44 | 0.5 | 100 |
|  | 105 | 40 | 60 | 39 | 0.4 | 100 |
|  | 106 | 51 | 49 | 20 | 0.1 | 100 |
|  | 107 | 62 | 38 | 21 | 0.2 | 100 |
|  | 108 | 71 | 29 | 19 | 0.2 | 100 |
|  | 109 | 80 | 20 | 18 | 0.1 | 100 |
|  | 110 | 90 | 10 | 16 | 0.2 | 100 |
| Comparative Example | 101 | — | — | 1 | 0.5 | 100 |
|  | 102 | 100 | 0 | 8 | 2.0 | 1 |
|  | 103 | 0 | 100 | 15 | 2.5 | 2 |
|  | 104 | 0 | 100 | 12 | 0.2 | 100 |

[1]Unit is mass %.
[2]Unit is ppm.

For the bearings in the examples 101 to 110 and the comparative examples 102 to 104, EDX measurement of the formed metal coating was conducted and a content of zinc and a content of tin contained in the metal coating were measured. The measurement range is a region of 250 μm×200 μm on the surface of the metal coating and an acceleration voltage is 10 kV. The result is shown in Table 6. In any of the bearings, the thickness of the metal coating was 0.05 to 8 μm. When a sectional structure of the metal coating was observed using a characteristic X ray, mixture of the above-mentioned double-layer structure, alloy structure and complex structure was estimated for the examples 101 to 110.

Figure 24:
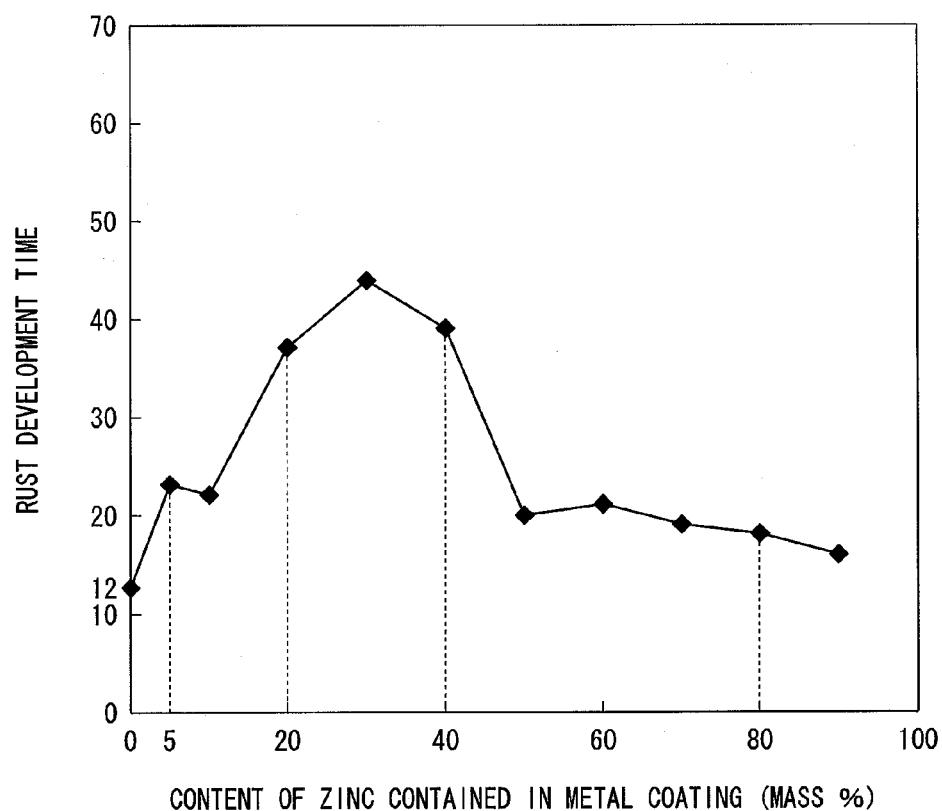
FIG. 24 is a graph illustrating a relation between a content of zinc contained in metal coating and rust-proof properties.

The bearing obtained as above is degreased and then left under an environment with a temperature of 60° C. and humidity of 90% and a time (rust development time) till point-like red rust develops on the outer peripheral surface of the outer ring and the inner peripheral surface of the inner ring was measured. The result is shown in Table 6 and a graph in FIG. 24. The numerical values of the rust development time in Table 6 and the graph in FIG. 24 are shown in relative values supposing that the rust development time of the bearing in the comparative example 101 is 1.

Since the bearings in the examples 101 to 110 are provided with the metal coating containing zinc and tin, rust is extremely hard to develop as compared with the bearing in the comparative example 101 in which the rust-proof treatment is applied by applying the rust preventive oil. It is known that if the content of zinc contained in the metal coating is 5 mass % or more and 80 mass % or less, the rust-proof property is more excellent and the rust-proof property is further excellent if the content is 20 mass % or more and 40 mass % or less.

[Hydrogen Embrittlement Evaluation]

The hydrogen concentrations in the steel constituting the outer ring of the bearings in the examples 101 to 110 and the comparative examples 101 to 104 were measured by hydrogen desorption analysis. The method will be described below in detail.

First, a part of the outer ring is cut off, and the surface on which the metal coating is formed was polished using a diamond polishing fluid with a diameter of 1 μm and a buffing cloth so as to remove the metal coating. Thus obtained test piece was placed in a glass tube and heated using an infrared image furnace for heating by irradiating an infrared ray from outside (the heating rate is 15° C./min). And hydrogen desorbed from the test piece in a temperature range from a room temperature to 450° C. was led to a mass spectrometer (Massmate200 by Nihon Shinkuu Gijutsu Kabushiki Kaisha) for measurement of a hydrogen amount. The temperature measurement was carried out by thermocouple brought into contact with the test piece.

In the mass spectrometer, the hydrogen gas desorbed in a vacuum is ionized in a mass spectrometer tube. The ionization intensity is converted to a hydrogen desorption rate with an ionization intensity of a proven standard leak as a reference. The hydrogen concentration is acquired by integrating the hydrogen desorption rate. At that time, presence of hydrogen desorption was determined by comparing hydrogen desorption rate profiles of a hydrogen-charged material and a hydrogen-uncharged material, and moreover, spots stabilized at the lowest level before and after were connected to make it as background and the hydrogen concentration was acquired. The acquired hydrogen concentrations in the steel are shown in Table 6.

The bearings in the examples 101 to 110 have considerably low hydrogen concentration in the steel at 0.5 ppm or less as compared with the bearings in the comparative examples 102, 103 to which the rust-proof treatment is applied by the conventional electric plating method. This is at the same level as the bearing in the comparative example 101.

Next, a relation between the hydrogen concentration in the steel and a degree of occurrence of hydrogen embrittlement was studied. First, the outer ring was cut off and a portion of approximately ⅓ is removed, and a test piece substantially in the C-shape was made from the remaining approximately ⅔ portion. A constant load (400N) is applied to both end portions so that the both open end portions of this test piece are closed and time till rupture occurs (rupture time) was measured. The result is shown in Table 6. The numerical values of the rupture time in Table 6 are shown in relative values supposing that the rupture time of the bearing in the comparative example 102 is 1. If no rupture occurs even though time of 100 times of the rupture time of the comparative example 102 is exceeded, the test was stopped and the rupture time was made 100.

Since the examples 101 to 110 have lower hydrogen concentrations in the steel than the comparative examples 102, 103 to which the rust-proof treatment is applied by the conventional electric plating method, hydrogen embrittlement was hard to occur and durability was excellent.

Fifth Embodiment

This embodiment relates to rolling bearings and is particularly suitable for application to the bearing used in office equipment such as copying machine, printer, cash dispenser and the like.

Many of unit members of the copying machine and printer and the like represented by photoreceptor drum are replaced by part at maintenance and if rust develops at the bearing used therein, smooth replacement becomes impossible, and the rust-proof property is required for the bearings.

Also, for the roller at a sheet tray drawer part of office equipment or sheet feeding roller of cash dispenser and ticket vending machine, there is a method of using the bearing outer ring also as a roll, and since such bearings are used in a high-temperature and high-humidity environment, corrosion resistance is required.

Moreover, in order to improve image quality of the office equipment such as copying machine, printer, cash dispenser and the like or to take measures against electromagnetic wave or static electricity, conductivity is imparted to bearing in many cases.

Usually, a stainless material is often used for inner and outer rings in order to give rust-proof property and corrosion resistance to the bearings. Also, Patent Documents 7, 8 disclose a method of giving the rust-proof property and corrosion resistance to the bearings by applying electroless nickel plating on the surface of the bearing steel. Moreover, Patent Document 7 discloses a method of forming rust-proof coating on the surface of the bearing steel by applying shot peening processing of Sn single body on the surface of the bearing steel.

However, the office equipment and the like has corrosion resistance request for the general environment, and there is a problem that use of a stainless material for a bearing used in the office equipment such as copying machine, printer, cash dispenser and the like is difficult from the viewpoint of material cost and working cost.

In the method of applying electroless nickel plating on the surface of the bearing steel, since its process takes a long time and diversified, there is a problem that costs are raised and use of environmentally regulated substances such as cadmium, lead and the like cannot be avoided.

Moreover, in the method of applying shot peening processing of the Sn single body on the surface of the bearing steel, there is a problem that sufficient rust-proof property cannot be obtained.

Thus, the present invention has an object to provide a rolling bearing that can provide rust-proof property, corrosion resistance and conductivity while suppressing cost rise.

In order to solve the above problems, the present invention is configured as follows. That is, the rolling bearing according to the present invention is provided with an inner ring, an outer ring, a plurality of rolling elements arranged rotatably between the inner ring and the outer ring, a corrosion-resistant coating formed by shot peening of a solid lubricant having a rust-proof effect on a surface of at least either one of the inner ring and the outer ring, and conductive grease provided between the inner ring and the outer ring.

As a result, it becomes possible to form the corrosion-resistant coating on the surface of the bearing steel with a simple method as shot peening, and there is no need any more to use an expensive stainless steel as the base material or to apply the electroless nickel plating on the surface of the bearing steel. Thus, it becomes possible to impart the rust-proof property and corrosion resistance to the bearings while suppressing cost rise. Also, by sealing the conductive grease between the inner ring and the outer ring, oxidation of the race surface, which is harmful to conductivity, can be prevented while lubrication property on the race surface is suppressed, and conductivity of the rolling bearing can be ensured for a long time.

In this rolling bearing, the corrosion-resistant coating is preferably provided with a first layer coating formed by shot peening with Zn as a shot media and a second layer coating formed by shot peening with Sn as a shot media.

Thereby, even if Fe is used in the base material, it becomes possible to cover the base material with Zn less noble than Fe and to cover Zn with Sn nobler than Fe. Thus, even if the rolling bearing is left in a high-humidity environment, Zn is oxidized with priority rather than Fe so as to generate zinc oxide ZnO, and rust development on Fe can be prevented. Moreover, even if ZnO is generated, generation of a white powder caused by ZnO can be prevented by Sn, which is hard to develop rust in itself, and the base material can be effectively protected from oxidation.

Also, in this rolling bearing, the thickness of the corrosion-resistant coating is preferably 0.5 μm or more and 5 μm or less. By setting the thickness of the corrosion-resistant coating at 0.5 μm or more, it becomes possible to obtain sufficient and sustainable rust-proof effect and by setting the thickness of the corrosion-resistant coating at 5 μm or less, separation of the corrosion-resistant coating can be suppressed.

Moreover, the rolling bearing can be used as bearing with a locating snap ring, bearing with conductive heat-insulating bush, flanged bearing or resin wrap bearing. Thereby, the rolling bearing can be effectively used in office equipment such as copying machine, printer, cash dispenser and the like as the bearing provided with rust-proof property, corrosion resistance and conductivity.

Moreover, the rolling bearing can be used as bearing for office equipment. Thereby, request for corrosion resistance to the general environment can be satisfied, and rust-proof property, corrosion resistance and conductivity can be imparted while cost rise is suppressed.

As described above, according to the present invention, rust-proof property, corrosion resistance and conductivity can be imparted to the bearing while suppressing cost rise, and the bearing can be effectively used in office equipment such as copying machine, printer, cash dispenser and the like.

The rolling bearing according to the fifth embodiment will be described below referring to the attached drawings. FIG. 25 is a sectional view illustrating outline configuration of the rolling bearing according to the fifth embodiment. In FIG. 25, a rolling bearing 201 is provided with an inner ring 202 and an outer ring 203, and a plurality of rolling elements (balls) 204 are rotatably arranged between the inner ring 202 and the outer ring 203. And by fixing an inner diameter part of the inner ring 202 to a shaft member 206 and by fixing an outer diameter part of the outer ring 203 to a bearing support part 207 of a rotating drum, the bearing support part 207 can be rotatably supported.

Here, the surface of at least either one of the inner ring 202 and the outer ring 203 is coated with corrosion-resistant coating 205, and the corrosion-resistant coating 205 can be formed by shot peening of a solid lubricant having rust-proof effect. Also, conductive grease may be provided between the inner ring 202 and the outer ring 203.

Thereby, the corrosion-resistant coating 205 can be formed on the surface of the bearing steel with a simple method as shot peening with short processing time and capable of processing a large quantity at a time, and there is no more need to use an expensive stainless steel as the base material or to apply electroless nickel plating on the surface of the bearing steel. Thus, it becomes possible to impart rust-proof property and corrosion resistance to the rolling bearing 201 while suppressing cost rise.

By forming a corrosion-resistant coating 205 on the whole surfaces of the inner ring 202 and the outer ring 203, the lubrication effect on the race surface can be obtained and the life of the rolling bearing 201 can be prolonged. Particularly, in the office equipment such as copying machine, printer, cash dispenser, ticket vending machine and the like, there are many portions used at a low speed and high load, and the lubrication effect by the corrosion-resistant coating 205 is large.

Also, by forming the corrosion-resistant coating 205 on the inner ring 202 and the outer ring 203, there is no more need to apply the rust preventive oil on the surfaces of the inner ring 202 and the outer ring 203, and even if a resin member is arranged in the periphery, corrosion on the resin member caused by the chemical attack can be prevented.

By sealing the conductive grease between the inner ring 202 and the outer ring 203, oxidation on the race surface harmful to conductivity can be prevented while ensuring lubrication property on the race surface, and the conductivity of the rolling bearing 201 can be ensured for a long time.

The thickness of the corrosion-resistant coating 205 is preferably 0.5 μm or more and 5 μm or less. By setting the thickness of the corrosion-resistant coating 205 at 0.5 μm or more, it becomes possible to obtain sufficient and sustainable rust-proof effect and by setting the thickness of the corrosion-resistant coating 205 at 5 μm or less, separation of the corrosion-resistant coating can be suppressed.

The metal coating 205 may be formed on the entire surfaces of the inner ring 202, the outer ring 203, that is, the inner peripheral surface, the outer peripheral surface including the raceway surface, both side surfaces of the inner ring 202 and the inner peripheral surface including the raceway surface, the outer peripheral surface, both side surfaces of the outer ring 203, but the above-mentioned effect can be also obtained by formation only on a part of the surface. The shot peening processing may be applied on a predetermined finishing working surface, or polishing working or vanishing working may be applied after the shot peening processing.

The above-mentioned rolling bearing can be used as a bearing with a locating snap ring, a bearing with conductive heat-insulating bush, a flanged bearing or a resin wrap bearing. Moreover, the above-mentioned rolling bearing is preferably used as bearing for office equipment such as copying machine, printer, cash dispenser, ticket vending machine and the like.

Also, the corrosion-resistant coating 205 preferably comprises a first layer coating formed by shot peening with Zn as a shot media and a second layer coating formed by shot peening with Sn as a shot media.

Figure 26A:
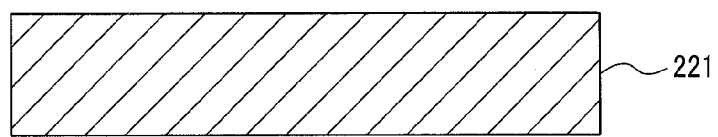
FIGS. 26A, 26B and 26C are the sectional views illustrating shot peening processing.
Figure 26B:
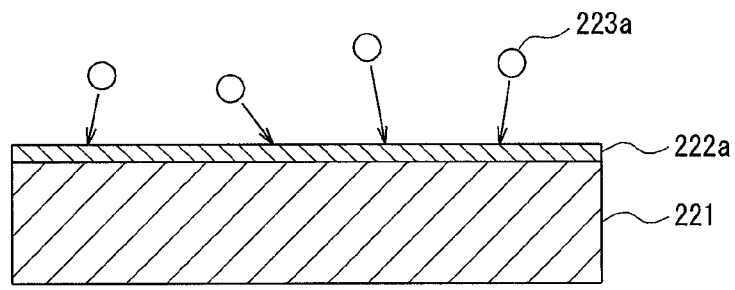
Figure 26C:
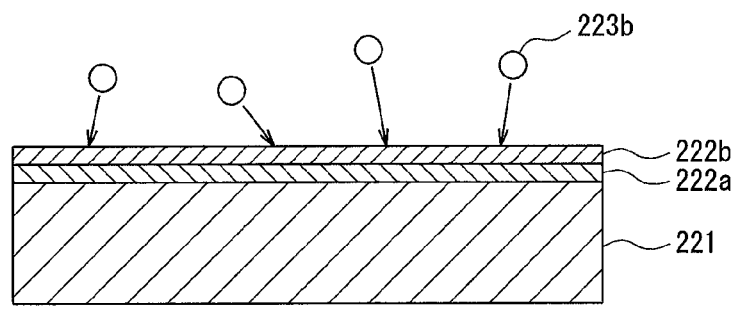

FIGS. 26A, 26B and 26C are sectional diagrams illustrating the shot peening processing. In FIG. 26A, bearing steel 221 is prepared. Here, as the bearing steel 221, an inexpensive Fe can be used.

Subsequently, as shown in FIG. 26B, by projecting a shot media 223a to the surface of the bearing steel 221, a corrosion-resistant coating 222a is formed on the surface of the bearing steel 221. By using a Zn powder as the shot media 223a, Zn coating can be formed as the corrosion-resistant coating 222a.

Subsequently, as shown in FIG. 26C, by projecting a shot media 223b on the bearing steel 221 on which the corrosion-resistant coating 222a is formed, corrosion-resistant coating 222b is formed on the surface of the corrosion-resistant coating 222a. By using a Sn powder as the shot media 223b, Sn coating can be formed as the corrosion-resistant coating 222b.

Thereby, even if Fe is used for the bearing steel 221, the bearing steel 221 be covered by Zn less noble than Fe and Zn can be also covered by Sn nobler than Fe. Thus, even if the rolling bearing is left in a high-humidity environment, Zn is oxidized with priority over Fe so as to generate zinc oxide ZnO and rust development on Fe can be prevented. Moreover, even if zinc oxide ZnO is generated, generation of a white powder caused by zinc oxide ZnO can be prevented by Sn, which is hard to develop rust in itself, and the base material can be effectively protected from oxidation.

The conductive grease will be described below in detail. The type of the conductive grease is not particularly limited as long as carbon black is contained and conductivity is provided, but two or three types of carbon black are preferably used at the same time.

First, when two types are used at the same time, such conductive grease is preferable that contains base oil containing at least either one of mineral oil and synthetic oil and two types of carbon black, and the two types of carbon black are first carbon black with specific surface area of 20 m$^2$/g or more and 80 m$^2$/g or less and second carbon black with specific surface area of 200 m$^2$/g or more and 1500 m$^2$/g or less.

With the above configuration, excellent conductivity is exerted and leakage of the conductive grease is hard to occur. That is, the excellent conductivity is provided by the first carbon black and oil separation of the conductive grease is suppressed by the second carbon black. And since both the carbon blacks are contained, aggregation between carbon blacks is suppressed and appropriate fluidity is imparted to the conductive grease.

If the specific surface areas of both the carbon blacks are in the above range, the above-mentioned excellent effects can be obtained, but the specific surface area of the first carbon black is more preferably 23 m$^2$/g or more and 80 m$^2$/g or less, further preferably 23 m$^2$/g or more and 60 m$^2$/g or less, or most preferably 27 m$^2$/g or more and 42 m$^2$/g or less. The specific surface area of the second carbon black is more preferably 250 m$^2$/g or more and 1000 m$^2$/g or less, further preferably 320 m$^2$/g or more and 1000 m$^2$/g or less, or most preferably 370 m$^2$/g or more and 1000 m$^2$/g or less. The numerical values of the specific surface area in the present invention are values measured by nitrogen adsorption method.

Also, since chemical attack of the mineral oil and synthetic oil on the resin is small, even if the conductive grease or base oil leaks from the rolling bearing and is brought into contact with the peripheral resin parts, the resin parts are hard to deteriorate. Since many resin parts are used in the office equipment such as copying machine, printer, cash dispenser and the like, grease having mineral oil or synthetic oil as the base oil is preferable. Among the mineral oil and synthetic oil, the chemical attack of synthetic hydrocarbon oil is particularly small.

A DBP absorption amount of the first carbon black is preferably 30 ml/100 g or more and 160 ml/100 g or less and the DBP absorption amount of the second carbon black is preferably 80 ml/100 g or more and 500 ml/100 g or less.

If the DBP absorption amount of the first carbon black is less than 30 ml/100 g, diffusion property of the first carbon black in the conductive grease easily becomes insufficient, while if 160 ml/100 g is exceeded, the effect to prevent aggregation between the carbon blacks becomes lower. In order to prevent such problem, the DBP absorption amount of the first carbon black is more preferably 50 ml/100 g or more and 160 ml/100 g or less, more preferably 60 ml/100 g or more and 150 ml/100 g or less, or most preferably 67 ml/100 g or more and 140 ml/100 g or less.

If the DBP absorption amount of the second carbon black is less than 80 ml/100 g, leakage of base oil and the like easily occurs, while if 500 ml/100 g is exceeded, carbon blacks tend to aggregate more easily. In order to prevent such problem, the DBP absorption amount of the second carbon black is more preferably 90 ml/100 g or more and 450 ml/100 g or less, more preferably 100 ml/100 g or more and 400 ml/100 g or less, or most preferably 140 ml/100 g or more and 360 ml/100 g or less.

Moreover, a mass ratio between the first carbon black and the second carbon black is preferably 25:75 or more and 95:5 or less and the total content of the first carbon black and the second carbon black is preferably 1.5 mass % or more and 20 mass % or less of the conductive grease.

With such composition, the characteristics of both the carbon blacks are well balanced and conductivity and fluidity of the conductive grease become favorable. Also, leakage from the rolling bearing or oil separation of base oil becomes hard to occur.

If the proportion of the first carbon black in the total amount of the first carbon black and the second carbon black is less than 25 mass % (that is, the proportion of the second carbon black exceeds 75 mass %), thickening effect caused by the carbon black becomes large, and the contents of all the carbon blacks can be reduced but there is a fear that oil separation at a high temperature is increased.

On the other hand, if the proportion of the second carbon black is less than 5 mass % (that is the proportion of the first carbon black exceeds 95 mass %), holding power of the base oil becomes insufficient and the contents of all the carbon blacks need to be increased. Also, though initial conductivity is favorable, there is a fear that the favorable conductivity cannot be maintained for a long time.

In order to prevent such problem, the mass ratio between the first carbon black and the second carbon black is preferably 50:50 or more and 95:5 or less, more preferably 75:25 or more and 90:10 or less, or most preferably 75:25 or more and 88:12 or less.

Also, if the total content of the first carbon black and the second carbon black is less than 1.5 mass % of the entire conductive grease, there is a fear that the conductivity becomes insufficient and that oil separation of the base oil cannot be fully suppressed. On the other hand, if 20 mass % is exceeded, the fluidity of the conductive grease might be lowered.

In order to prevent such problem, the total content of the first carbon black and the second carbon black is preferably 3 mass % or more and 17 mass % or less of the entire conducive grease, more preferably 5 mass % or more and 15 mass % or less, or most preferably 7 mass % or more and 13 mass % or less.

Moreover, an average primary grain size of the first carbon black is preferably 40 nm or more and 200 nm or less and the average primary grain size of the second carbon black is preferably 10 nm or more and 40 nm or less.

If the average primary grain size is less than 10 nm, there is a good possibility that the carbon blacks aggregate, while if 200 nm is exceeded, fluidity of the conductive grease might be impaired. Since two types of carbon black with different average primary grain size are contained, the diffusion property of the carbon black is maintained properly and as a result, the holding power of the base oil becomes sufficient. Also, even if shearing acts, a chain structure of the carbon black particle is hard to be destructed.

Next, if three types of carbon black are used at the same time, such conductive grease is preferable that the base oil containing at least either one of the mineral oil and the synthetic oil and three types of carbon black are contained, and the three types of carbon black are a first carbon black with the specific surface area of 20 $m^2/g$ or more and 80 $m^2/g$ or less, a second carbon black with the specific surface area of 200 $m^2/g$ or more and 1500 $m^2/g$ or less, and a third carbon black with the specific surface area exceeding 80 $m^2/g$ and less than 200 $m^2/g$.

With such composition, extremely excellent conductivity is exerted and leakage of the conductive grease is extremely hard to occur. That is, the excellent conductivity is imparted by the first and the third carbon black and oil separation of the conductive grease is suppressed by the second carbon black. And since the three types of carbon black are contained, aggregation among the carbon blacks is suppressed, and appropriate fluidity is imparted to the conductive grease. Also, even if shearing acts, a chain structure of the carbon black particle is hard to be destructed and the holding power of the base oil is high.

If the specific surface areas of the three types of carbon black are within the above range, the above-mentioned excellent effect can be obtained, but the specific surface area of the first carbon black is more preferably 23 $m^2/g$ or more and 80 $m^2/g$ or less, further preferably 23 $m^2/g$ or more and 60 $m^2/g$ or less, or most preferably 27 $m^2/g$ or more and 42 $m^2/g$ or less. The specific surface area of the second carbon black is more preferably 250 $m^2/g$ or more and 1000 $m^2/g$ or less, further preferably 320 $m^2/g$ or more and 1000 $m^2/g$ or less, or most preferably 370 $m^2/g$ or more and 1000 $m^2/g$ or less. Moreover, the specific surface area of the third carbon black is more preferably 90 $m^2/g$ or more and 180 $m^2/g$ or less, further preferably 100 $m^2/g$ or more and 160 $m^2/g$ or less, or most preferably 110 $m^2/g$ or more and 140 $m^2/g$ or less.

Moreover, since chemical attack of the mineral oil and synthetic oil on the resin is small, even if the conductive grease or base oil leaks from the rolling bearing and is brought into contact with the peripheral resin parts, the resin parts are hard to deteriorate. Since many resin parts are used in steering devices for vehicle and their periphery, grease having mineral oil or synthetic oil as the base oil is preferable. Among the mineral oil and synthetic oil, the chemical attack of synthetic hydrocarbon oil is particularly small.

The DBP absorption amount of the first carbon black is preferably 30 ml/100 g or more and 160 ml/100 g or less, the DBP absorption amount of the second carbon black is preferably 80 ml/100 g or more and 500 ml/100 g or less, and the DBP absorption amount of the third carbon black is preferably 100 ml/100 g or more and 300 ml/100 g or less.

If the DBP absorption amount of the first carbon black is less than 30 ml/100 g, diffusion property of the first carbon black in the conductive grease easily becomes insufficient, while if 160 ml/100 g is exceeded, the effect to prevent aggregation between the carbon blacks becomes lower. In order to prevent such problem, the DBP absorption amount of the first carbon black is more preferably 50 ml/100 g or more and 160 ml/100 g or less, more preferably 60 ml/100 g or more and 150 ml/100 g or less, or most preferably 67 ml/100 g or more and 140 ml/100 g or less.

If the DBP absorption amount of the second carbon black is less than 80 ml/100 g, leakage of base oil and the like easily occurs, while if 500 ml/100 g is exceeded, carbon blacks tend to aggregate more easily. In order to prevent such problem, the DBP absorption amount of the second carbon black is more preferably 90 ml/100 g or more and 450 ml/100 g or less, more preferably 100 ml/100 g or more and 400 ml/100 g or less, or most preferably 140 ml/100 g or more and 360 ml/100 g or less.

Moreover, if the DBP absorption amount of the third carbon black is less than 100 ml/100 g, diffusion property into the conductive grease easily becomes insufficient similarly to the first carbon black, while if 160 ml/100 g is exceeded, the effect to prevent aggregation between the carbon blacks becomes lower similarly to the first carbon black. In order to prevent such problem, the DBP absorption amount of the third carbon black is more preferably 110 ml/100 g or more and 250 ml/100 g or less, more preferably 120 ml/100 g or more and 200 ml/100 g or less, or most preferably 140 ml/100 g or more and 180 ml/100 g or less.

Moreover, a mass ratio between the first carbon black and the second carbon black is preferably 25:75 or more and 95:5 or less and the total content of the first carbon black, the second carbon black, and the third carbon black is preferably 2 mass % or more and 25 mass % or less of the conductive grease.

With such composition, the characteristics of the three types of carbon blacks are well balanced and conductivity and fluidity of the conductive grease become favorable. Also, leakage from the rolling bearing or oil separation of base oil becomes hard to occur.

If the proportion of the first carbon black in the total amount of the first carbon black and the second carbon black is less than 25 mass % (that is, the proportion of the second carbon black exceeds 75 mass %), thickening effect caused by the carbon black becomes large, and the contents of all the carbon blacks can be reduced but there is a fear that oil separation at a high temperature is increased. On the other hand, if the proportion of the second carbon black is less than 5 mass % (that is, the proportion of the first carbon black exceeds 95 mass %), holding power of the base oil becomes insufficient and the contents of all the carbon blacks need to be increased. Also, though initial conductivity is favorable, there is a fear that the favorable conductivity cannot be maintained for a long time.

In order to prevent such problem, the mass ratio between the first carbon black and the second carbon black is preferably 50:50 or more and 95:5 or less, more preferably 75:25 or more and 90:10 or less, or most preferably 75:25 or more and 88:12 or less.

Also, if the total content of the first carbon black, the second carbon black, and the third carbon black is less than 2 mass % of the conductive grease, there is a fear that the conductivity becomes insufficient and that oil separation of the base oil cannot be fully suppressed. On the other hand, if 25 mass % is exceeded, there is a fear that the fluidity of the conductive grease might be lowered.

In order to prevent such problem, the total content of the first carbon black, the second carbon black, and the third carbon black is preferably 5 mass % or more and 19 mass % or less of the conducive grease, more preferably 7 mass % or more and 22 mass % or less, or most preferably 9 mass % or more and 20 mass % or less.

Moreover, an average primary grain size of the first carbon black is preferably 40 nm or more and 200 nm or less, the average primary grain size of the second carbon black is preferably 10 nm or more and 40 nm or less, and the average primary grain size of the third carbon black is preferably 10 nm or more and 40 nm or less.

If the average primary grain size is less than 10 nm, there is a good possibility that the carbon blacks aggregate, while if 200 nm is exceeded, the fluidity of the conductive grease might be impaired. Since three types of carbon black with different average primary grain size are contained, the diffusion property of carbon black is maintained properly and as a result, the holding power of the base oil becomes sufficient. Also, even if shearing acts, a chain structure of the carbon black particle is hard to be destructed.

Such carbon black may be selected from various commercial products based on the average primary grain size, specific surface area, and DBP absorption amount. For example, "Tokablack" series and "Seast" series by Tokai Carbon Co., Ltd., "Mitsubishi Carbon Black" series by Mitsubishi Chemical Corporation, "Denka Black" series by Denki Kagaku Kogyo Kabushiki Kaisha, "Ketjen Black" series by Lion Akzo Co., Ltd. may be used. Also, so-called acetylene black, fly ash and the like may be used as long as features such as the average primary grain size, specific surface area and the like are within the range of the present invention.

Specifically, as the first carbon black, Tokablack #7360SB, #7350/F, #7270SB, #7100F, #7050, #4500, #4400, #4300, #3845, #3800 of the "Tokablack" series, Seast3, NH, N, 116HM, 116, FM, SO, V, SVH, FY, S, SP of the "Seast" series can be used. Also, MA220, MA230, #25, #20, #10, #5, #95, #260, #3030, #3050, CF9 of the "Mitsubishi Carbon Black" series and Denka Black particle products, powder products, HS-100 and the like of the "Denka Black" series can be used.

Among them, Tokablack #7050 (average primary grain size of 66 nm, specific surface area of 28 $m^2/g$, DBP absorption amount of 66 ml/100 g), Seast V (average primary grain size of 62 nm, specific surface area of 27 $m^2/g$, DBP absorption amount of 87 ml/100 g), Seast SVH (average primary grain size of 62 nm, specific surface area of 32 $m^2/g$, DBP absorption amount of 140 ml/100 g), Seast S (average primary grain size of 66 nm, specific surface area of 27 $m^2/g$, DBP absorption amount of 68 ml/100 g), Denka Black HS-100 (average primary grain size of 48 nm, specific surface area of 39 $m^2/g$, DBP absorption amount of 140 ml/100 g) can be used suitably.

Also, as the second carbon black, Tokablack #8500/F, #8300,/F, #5500, Mitsubishi Carbon Black #2700, #2650, #2600, #2400, #2350, #2300, #2200, #990, #980, #970, #960, #950, #900, #850, #3230 and Ketjen Black EC and the like can be used.

Among them, Tokablack #5500 (average primary grain size of 25 nm, specific surface area of 225 $m^2/g$, DBP absorption amount of 155 ml/100 g), Mitsubishi Carbon Black #3230 (average primary grain size of 23 nm, specific surface area of 220 $m^2/g$, DBP absorption amount of 140 ml/100 g), Ketjen Black EC (average primary grain size of 30 nm, specific surface area of 800 $m^2/g$, DBP absorption amount of 360 ml/100 g) can be used suitably.

Moreover, as the third carbon black, Mitsubishi Carbon Black #3350 (average primary grain size of 24 nm, specific surface area of 125 $m^2/g$, DBP absorption amount of 165 ml/100 g) and the like can be used.

Also, as the base oil, mineral oil and synthetic oil are suitable. The mineral oil includes paraffin mineral oil and naphthenic mineral oil, for example, and the synthetic oil includes ester oil, ether oil, polyglycol oil, silicon oil, synthetic hydrocarbon oil, fluorosilicon oil, and fluorine oil, for example. Among them, in view of high heat resistance and small chemical attack on resin, fluorine oil and synthetic hydrocarbon oil are preferable and perfluoropolyether oil and poly α-olefin oil are particularly preferable.

The dynamic viscosity of the base oil at 40° C. is preferably 10 $mm^2/s$ or more and 2000 $mm^2/s$ or less. If the dynamic viscosity at 40° C. is less than 10 $mm^2/s$, heat resistance might become insufficient, while 2000 $mm^2/s$ is exceeded, there is a fear that the torque of the rolling bearing might become excessive. If the rolling bearing is used at a high temperature of approximately 200° C., in view of torque performance and heat resistance, the dynamic viscosity of the base oil at 40° C. is preferably 20 $mm^2/s$ or more and 200 $mm^2/s$ or less, or more preferably 25 $mm^2/s$ or more and 100 $mm^2/s$. In the case of use in a cold area, a pour point of the base oil is preferably −32.5° C. or below.

Worked penetration of such conductive grease is preferably 200 or more and 400 or less. If the worked penetration is less than 200, the conductive grease is hard and fluidity is insufficient, while if 400 is exceeded, the conductive grease is soft and there is a fear that leakage or the like occurs from the rolling bearing.

A puffing agent may be added to the conductive grease in order to adjust the worked penetration. The type of the puffing agent is not particularly limited but at least one of lithium soap, urea compound, polytetrafluoroethylene (hereinafter referred to as PTFE) is preferably used.

An average primary grain size of the puffing agent is preferably 5 nm or more and 10 μm or less. If the average primary grain size is less than 5 nm, thickening effect is poor, while if 10 μm is exceeded, it might act as a foreign substance if used in the rolling bearing.

A content of the puffing agent is not particularly limited as long as the worked penetration of the conductive grease is 200 or more and 400 or less, but in the case of lithium soap, it is preferably 1 mass % or more and 10 mass % or less, and in the case of PTFE, it is preferably 1.5 mass % or more and 20 mass % or less. In any case, if the content is less than the lower limit value, the thickening effect is poor, while if the upper limit value is exceeded, fluidity of the conductive grease might become insufficient.

Particularly if lithium soap or PTFE is added when the first, second, and third carbon blacks are contained, the conductive grease with small change in consistency, fluidity, and conductivity from low to high temperatures can be obtained.

Moreover, to the conductive grease, the following powders and fibrous substances may be added as additives. That is, a powder of one type or more of metal oxides, metal nitrides, metal carbides, clay minerals, cluster diamond, and fullerene with the average primary grain size of 5 nm or more and 10 μm or less may be added in 0.05 mass % or more and 5 mass % or less of the entire conductive grease.

With such composition, generation of oxide coating on the raceway surface or rolling element surface of the rolling bearing can be suppressed. If the average primary grain size of each of the above-mentioned powders is less than 5 nm, the effect to prevent generation of the oxide coating becomes insufficient, while if 10 μm is exceeded, it might act as a foreign substance when used in the rolling bearing. In order to prevent such problem, the average primary grain size of each of the above-mentioned powders is more preferably 5 nm or more and 2 μm or less, further preferably 10 nm or more and 500 nm or less, or most preferably 10 nm or more and 200 nm or less.

Also, if the content of the powder is less than 0.05 mass % of the entire conductive grease, the effect to prevent generation of the oxide coating becomes poor, while if 5 mass % is exceeded, fluidity of the conductive grease might be lowered or the raceway surface or rolling element surface might be excessively cut off. In order to prevent such problem, the powder content is more preferably 0.05 mass % or more and 2 mass % or less of the entire conductive grease, further preferably 0.1 mass % or more and 1 mass % or less, or most preferably 0.1 mass % or more and 0.5 mass % or less.

Specific examples of such powder include silica (silicon oxide), alumina (aluminum oxide), titanium oxide, zinc oxide, zirconium oxide, barium titanate, zirconium titanate, silicon nitride, zirconium nitride, chromium nitride, silicon carbide, titanium carbide, tungsten carbide, smectite, bentonite, boron nitride, carbon nitride, C60 fullerene, C72 fullerene, C84 fullerene and the like. Among them, metal oxides such as magnesium oxide, zinc oxide, zirconium oxide and the like are particularly suitable and magnesium oxide is optimum.

Also, one or more of carbon nanotube, carbon nanofiber, carbon nanohorn, carbon fiber, and metal oxide whisker with a fiber length of 5 nm or more and 10 μm or less and aspect ratio of 5 or more and 1000 or less may be added in 0.05 mass % or more and 5 mass % or less of the entire conductive grease.

The conductive grease containing such fibrous substances has more excellent conductivity. If the fiber length of each of the above-mentioned fibrous substances is less than 5 nm, the effect to improve conductivity is poor, while 10 μm is exceeded, it might act as a foreign substance when used in the rolling bearing. Also, if the content of the fibrous substance is less than 0.05 mass % of the entire conductive grease, the effect to improve conductivity is poor, while 5 mass % is exceeded, fluidity of the conductive grease might be lowered.

Moreover, various additives used in general in lubricants may be added to the conductive grease, and at least one of extreme-pressure agent and oiliness agent among additives is preferably added. The total content of the extreme-pressure agent and oiliness agent is preferably 0.1 mass % or more and 5 mass % or less of the entire conductive grease.

The type of extreme-pressure agent is not particularly limited but DTP metal compounds such as zinc dithiophosphate (Zn-DTP), molybdenum dithiophosphate (Mo-DTP) and the like and DTC metal compounds such as nickel dithiocarbamate (Ni-DTC), molybdenum dithiocarbamate (Mo-DTC) and the like can be cited. Also, organic metal compounds containing sulfur, phosphorus, chlorine and the like are suitable. Solid lubricants with excellent extreme-pressure property such as molybdenum disulfide and the like can be also used as the extreme-pressure agent. These extreme-pressure agents may be used singularly or two types or more may be combined in use.

Examples of the oiliness agent include aliphatic acid such as oleic acid and the like, aliphatic acid derivative such as succinic acid ester and the like, and organic phosphate compounds. The organic phosphate compounds include orthophosphoric ester represented by general formula $(RO)_3PO$, phosphite diester represented by general formula $(RO)_2P(O)H$, and phosphite ester such as phosphite triester represented by general formula $(RO)_3P$ (R represents hydrocarbon group such as alkyl group, aryl group, alkylaryl group and the like in any case). Specific examples of orthophosphoric ester include tricresyl phosphate and trioctyl phosphate. These oiliness agents may be used singularly or two or more types may be combined in use.

Also, additives other than the extreme-pressure agent and oiliness agent may be added if necessary. For example, they include antioxidant, rust preventive agent, metal deactivator.

The rust preventive agents include metal rust preventive agent, ashless rust preventive agent. Specific examples of the metal rust preventive agent include oil soluble sulfonate such as (petroleum) metal sulfonate (barium salt, calcium salt, magnesium salt, sodium salt, zinc salt, aluminum salt, lithium salt and the like), phenate, salicylate, phosphonate and the like. Specific examples of the ashless rust preventive agent include succinic imide, benzylamine, succinic acid ester, succinic acid half ester, polymethacrylate, polybutene, polycarboxylic acid ammonium salt and the like. Moreover, antioxidants include amine antioxidant (aliphatic amine and aromatic amine), phenol antioxidant, sulfur antioxidant and the like.

Moreover, the metal deactivator includes benzotriazol derivative, sodium nitrite, zinc oxide and the like. Since they can form a passive film, they have an effect to suppress oxidation on the raceway surface accompanying abrasion and the like.

Example

Using a rolling bearing with an inner diameter of 30 mm, an outer diameter of 42 mm, and a width of 7 mm, high-temperature and high-humidity rust test, conductive durability test and high-temperature durability test were conducted.

Here, as an example, the one in which shot peening processing in two stages of Zn and Sn is applied on the surface of the bearing steel was prepared (film thickness of 4 μm). As a comparative example, the one in which shot peening processing of Zn single body is applied on the surface of the bearing steel (film thickness of 3 μm), the one in which shot peening processing of Sn single body is applied on the surface of the bearing steel (film thickness of 3 μm), the one in which electroless nickel plating is applied to the surface of the bearing steel (film thickness of 3 μm), and a bearing steel itself were prepared.

In the high-temperature and high-humidity rust test, using a bearing inner-ring single body completely degreased, time when point rust develops was evaluated under the high-temperature and high-humidity condition of 70° C. and 90%.

In the conductive durability test, shot peening processing was applied only to the inner ring, and grease for normal temperature with conductive agent of carbon black, base oil of PAO, puffing agent of lithium soap and extreme-pressure additive added was used as the conductive grease. And the inner ring was rotated at a normal temperature at 150 $min^{-1}$ and radial load of 200 N, and the maximum resistance values of the inner and outer rings when 3000 hours have elapsed were measured.

In the high-temperature durability test, shot peening processing was applied only to the inner ring, and grease for high temperature with conductive agent of carbon black and base oil of fluorine oil was used as the conductive grease. And the inner ring was rotated at 200° C. at 150 $min^{-1}$ and radial load of 300 N, and the durability time of the bearing was evaluated.

Figure 29:
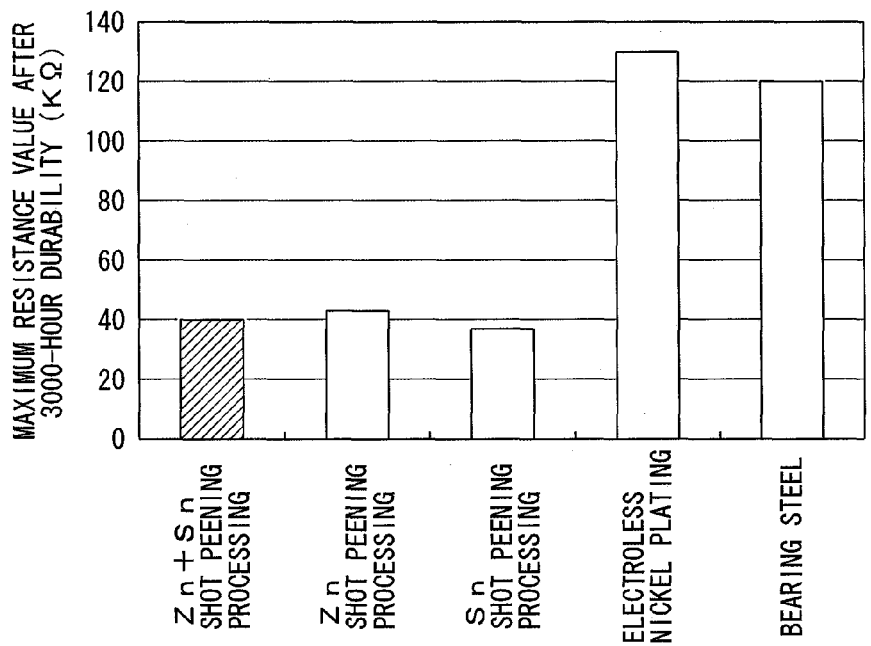
FIG. 29 is a graph illustrating a conductive durability test result of the rolling bearing according to the fifth embodiment.

FIG. 27 is a table illustrating the evaluation results of the rolling bearing according to one example of the present invention and the comparative examples, and FIG. 28 is a graph illustrating the rust test results of the rolling bearing according to one example of the present invention and the comparative examples. FIG. 29 is a graph illustrating the conductive durability test results of the rolling bearing according to one example of the present invention and the comparative examples, and FIG. 30 is a graph illustrating the high-temperature durability test results of the rolling bearing according to one example of the present invention and the comparative examples.

In FIGS. 27 and 28, on the bearing steel itself, rust developed after 24 hours have elapsed, on the one in which the shot peening processing of Zn single body was applied on the surface of the bearing steel, rust developed after 100 hours have elapsed, and on the one in which the shot peening processing of the Sn single body was applied on the surface of the bearing steel, rust developed after 200 hours have elapsed. On the other hand, there was no rust development even after 720 hours have elapsed on the one in which the two-stage shot peening processing of Zn and Sn was applied on the surface of the bearing steel, and it was found to have favorable rust-proof property.

Also, in FIGS. 27 and 29, the maximum resistance values of the inner and outer rings after 3000 hours have elapsed was 120 k$\Omega$ for the bearing steel itself and 130 k$\Omega$ for the one in which electroless nickel plating was applied to the surface of the bearing steel. On the other hand, the value was 40 k$\Omega$ for the one in which the two-stage shot peening processing of Zn and Sn was applied on the surface of the bearing steel, and conductivity performance of the bearing used in the office equipment was sufficiently satisfied.

Figure 30:
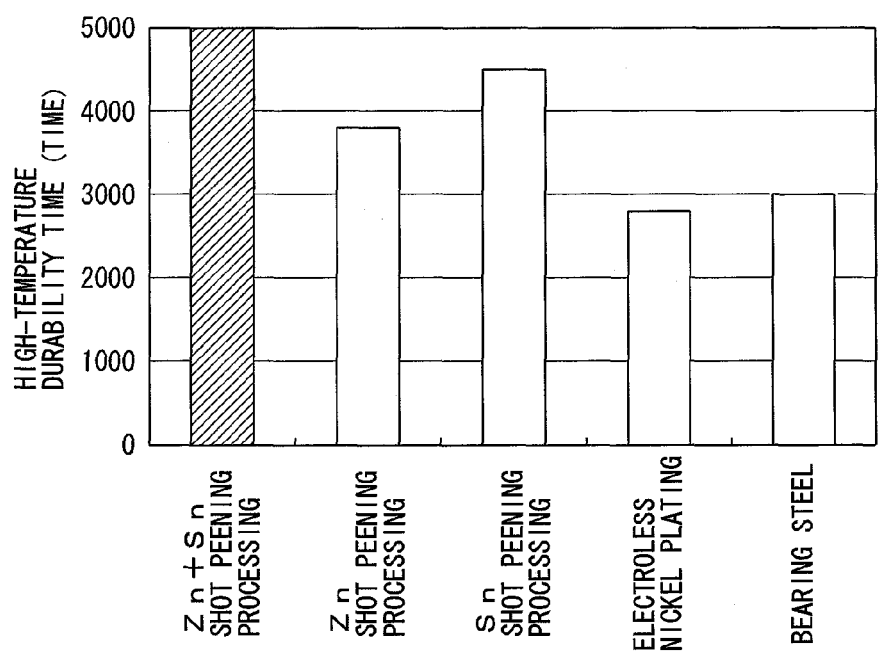
FIG. 30 is a graph illustrating a high-temperature durability test result of the rolling bearing according to the fifth embodiment.

In FIGS. 27 and 30, the high-temperature durability was 3000 hours for the bearing steel itself and 2800 hours for the one in which the electroless nickel plating was applied on the surface of the bearing steel. On the other hand, the durability was 50000 hours for the one in which the two-stage shot peening processing of Zn and Sn was applied on the surface of the bearing steel, which proves that favorable high-temperature durability is provided.

INDUSTRIAL APPLICABILITY

The present invention can be applied not only to bearings for guide roll used in continuous caster, rolling machine but also to the rolling devices for substantially all the usages such as agricultural machine, paper manufacturing machine, multi-purpose four-wheel buggy, construction machine, water-lubrication compressor, mine facilities, pump and the like. For example, bearings for roll neck of rolling machine can be cited as the bearing for steel-related facilities. Also, the present invention can be applied to swing ladder bearing, barrel roll of printing machine, bearing for power plant, bearing for electric motor and axle for railway vehicle, hub unit for automobile, bearing for electric equipment of automobile, constant-velocity joint of automobile, bearing for water pump of automobile, bearing for transmission of automobile, bearing for fan motor of air conditioner and the like, bearing for IC-cooling fan motor, bearing for general-purpose motor, bearing for spindle of machine tool, and a ball screw for electric injection molding machine.

Moreover, the present invention can be also applied to bearing for semiconductor manufacturing device including linear guide for XY table, bearing for food machine including kneading machine for paste products, various roller conveyers, and tappet rollers. Furthermore, the present invention can be also applied to office equipment and commercial and consumer machines such as copying machine, automatic ticket gate and the like, bearing for motor of cleaner, bearing for compressor, and warm for electric power steering. Also, the present invention can be applied to slide bearing.

The invention claimed is:

1. A rolling device comprising:
an inner member having a raceway surface on an outer surface;
an outer member having a raceway surface opposing the raceway surface of the inner member and arranged outside said inner member;
a plurality of rolling elements arranged rotatably between said raceway surfaces; and
a metal coating for corrosion resistance formed by shot-peening a powder of metal of zinc and tin onto at least any one of said inner member, said outer member, and said rolling elements, the metal coating being formed by shot-peening a tin powder after shot-peening a zinc powder,
wherein the roughness of a base material before the metal coating is formed is 0.01 μmRa-1 μmRa,
wherein the roughness of the metal coating is 10 μmRa or less, and
wherein a residual stress is generated in the base material by shot-peening.

2. A rolling device comprising:
an inner member having a raceway surface on an outer surface;
an outer member having a raceway surface opposing the raceway surface of the inner member and arranged outside said inner member;
a plurality of rolling elements arranged rotatably between said raceway surfaces; and
a metal coating for corrosion resistance formed by shot-peening a powder of metal of zinc and tin onto at least any one of said inner member, said outer member, and said rolling elements, the metal coating being formed by shot-peening a mixed powder of zinc and tin,
wherein the roughness of a base material before the metal coating is formed is 0.01 μmRa-1 μmRa,
wherein the roughness of the metal coating is 10 μmRa or less, and
wherein a residual stress is generated in the base material by shot-peening.

3. A rolling device comprising:
an inner member having a raceway surface on an outer surface;
an outer member having a raceway surface opposing the raceway surface of the inner member and arranged outside said inner member;
a plurality of rolling elements arranged rotatably between said raceway surfaces; and
a metal coating for corrosion resistance formed by shot-peening a powder of metal of zinc and tin onto at least any one of said inner member, said outer member, and said rolling elements, the metal coating being formed by shot-peening a powder of an alloy of zinc and tin,
wherein the roughness of a base material before the metal coating is formed is 0.01 μmRa-1 μmRa,
wherein the roughness of the metal coating is 10 μmRa or less, and
wherein a residual stress is generated in the base material by shot-peening.

4. The rolling device according to claim 1, wherein
a content of zinc contained in said metal coating is 5 mass %-80 mass % and a content of tin is 20 mass %-95 mass %.

5. The rolling device according to claim 1, wherein
said metal coating comprises steel, and hydrogen concentration in the steel is 0.5 ppm or less.

* * * * *